United States Patent
Olwal et al.

(10) Patent No.: US 12,505,665 B2
(45) Date of Patent: Dec. 23, 2025

(54) DISTRIBUTED SENSOR DATA PROCESSING USING MULTIPLE CLASSIFIERS ON MULTIPLE DEVICES

(71) Applicant: Google LLC, Mountain View, CA (US)

(72) Inventors: Alex Olwal, Santa Cruz, CA (US); Kevin Balke, Sunnyvale, CA (US); Dmitrii Votintcev, Menlo Park, CA (US)

(73) Assignee: GOOGLE LLC, Mountain View, CA (US)

(*) Notice: Subject to any disclaimer, the term of this patent is extended or adjusted under 35 U.S.C. 154(b) by 1015 days.

(21) Appl. No.: 17/594,209

(22) PCT Filed: Oct. 13, 2020

(86) PCT No.: PCT/US2020/055378
§ 371 (c)(1),
(2) Date: Oct. 6, 2021

(87) PCT Pub. No.: WO2022/081142
PCT Pub. Date: Apr. 21, 2022

(65) Prior Publication Data
US 2022/0165054 A1    May 26, 2022

(51) Int. Cl.
G06V 10/94 (2022.01)
G06V 10/764 (2022.01)
(Continued)

(52) U.S. Cl.
CPC ........... *G06V 10/95* (2022.01); *G06V 10/764* (2022.01); *G06V 40/168* (2022.01); *H04N 7/188* (2013.01)

(58) Field of Classification Search
CPC .... G06V 10/95; G06V 10/764; G06V 40/168; G06V 40/172; H04N 7/188; H04N 23/45;
(Continued)

(56) References Cited

U.S. PATENT DOCUMENTS 8,655,404 B1 * 2/2014 Singh ............... H04M 1/72403
455/518
9,324,322 B1   4/2016 Torok et al.
(Continued)

FOREIGN PATENT DOCUMENTS

CN   105182535 A   12/2015
CN   107978316 A    5/2018
(Continued)

OTHER PUBLICATIONS

Sawhney, et al., "Speaking and Listening on the Run: Design for Wearable Audio Computing", Digest of Papers, Second International Symposium on Wearable Computers (Cat. No. 98EX215), 1998, 8 pages.
(Continued)

*Primary Examiner* — Xuemei G Chen
(74) *Attorney, Agent, or Firm* — Brake Hughes Bellermann LLP

(57) ABSTRACT

According to an aspect, a method for distributed sound/image recognition using a wearable device includes receiving, via at least one sensor device, sensor data, and detecting, by a classifier of the wearable device, whether or not the sensor data includes an object of interest. The classifier configured to execute a first machine learning (ML) model. The method includes transmitting, via a wireless connection, the sensor data to a computing device in response to the object of interest being detected within the sensor data, where the sensor data is configured to be used by a second ML model on the computing device or a server computer for further sound/image classification.

19 Claims, 24 Drawing Sheets

(51) Int. Cl.
*G06V 40/16* (2022.01)
*H04N 7/18* (2006.01)

(58) Field of Classification Search
CPC .... H04N 23/61; H04N 23/651; H04N 23/661; G06F 1/32; G06F 18/241; G06N 3/045; G06N 3/08; G06N 20/00; G10L 15/08; G10L 15/26
See application file for complete search history.

(56) References Cited

U.S. PATENT DOCUMENTS

| | | | |
|---|---|---|---|
| 10,515,623 | B1 | 12/2019 | Grizzel |
| 10,896,597 | B1* | 1/2021 | Kocher .................. G06V 20/20 |
| 11,144,749 | B1* | 10/2021 | Lo .................... G08B 13/19669 |
| 11,402,871 | B1* | 8/2022 | Berliner ................ G06F 1/1616 |
| 11,647,167 | B2* | 5/2023 | Lee .......................... H04N 5/77 348/158 |
| 2007/0069976 | A1* | 3/2007 | Willins .................... H04M 1/05 345/8 |
| 2008/0180537 | A1* | 7/2008 | Weinberg ............... H04N 23/56 348/E5.029 |
| 2009/0204409 | A1 | 8/2009 | Mozer et al. |
| 2012/0221330 | A1 | 8/2012 | Thambiratnam et al. |
| 2012/0275690 | A1 | 11/2012 | Melvin et al. |
| 2013/0169536 | A1 | 7/2013 | Wexler et al. |
| 2014/0214596 | A1* | 7/2014 | Acker, Jr. ......... G06Q 30/0633 705/26.8 |
| 2016/0026853 | A1 | 1/2016 | Wexler et al. |
| 2016/0026870 | A1* | 1/2016 | Wexler ................ G06V 10/776 382/103 |
| 2016/0080295 | A1* | 3/2016 | Davies ................. H04M 3/533 709/204 |
| 2016/0080652 | A1 | 3/2016 | Shirota et al. |
| 2016/0094814 | A1 | 3/2016 | Gousev et al. |
| 2016/0125877 | A1 | 5/2016 | Foerster et al. |
| 2016/0203691 | A1 | 7/2016 | Arnold et al. |
| 2017/0213145 | A1* | 7/2017 | Pathak .................... G06N 5/04 |
| 2017/0249863 | A1 | 8/2017 | Murgia et al. |
| 2017/0293480 | A1* | 10/2017 | Wexler ..................... G06F 8/65 |
| 2018/0018451 | A1* | 1/2018 | Spizhevoy ............ G06V 40/19 |
| 2018/0307880 | A1* | 10/2018 | Gao .................. G06K 7/10831 |
| 2019/0035125 | A1* | 1/2019 | Bellows ................ G06V 20/10 |
| 2019/0087690 | A1 | 3/2019 | Srivastava |
| 2019/0093985 | A1* | 3/2019 | Robinson .................. F41J 5/10 |
| 2019/0222756 | A1 | 7/2019 | Moloney et al. |
| 2019/0331914 | A1 | 10/2019 | Lee et al. |
| 2019/0355379 | A1 | 11/2019 | Ravindran et al. |
| 2019/0373998 | A1* | 12/2019 | Knittel ..................... G08B 5/36 |
| 2019/0379822 | A1* | 12/2019 | Leong ..................... G06F 3/012 |
| 2020/0004291 | A1* | 1/2020 | Wexler ..................... G06F 1/163 |
| 2020/0034615 | A1 | 1/2020 | Croxford et al. |
| 2020/0069281 | A1 | 3/2020 | Chan et al. |
| 2020/0244885 | A1* | 7/2020 | Li .......................... H04N 23/80 |
| 2020/0357516 | A1* | 11/2020 | Kirby ..................... G16H 40/60 |
| 2020/0380952 | A1 | 12/2020 | Zhang et al. |
| 2021/0081749 | A1* | 3/2021 | Claire ..................... G06F 3/005 |
| 2021/0124045 | A1* | 4/2021 | Xiao ...................... G01S 13/88 |
| 2021/0350566 | A1* | 11/2021 | Hu ......................... G06V 40/10 |
| 2021/0365673 | A1* | 11/2021 | Stockton .................. G06N 3/04 |
| 2022/0060666 | A1* | 2/2022 | Lee ......................... G04G 21/02 |
| 2022/0240824 | A1* | 8/2022 | Maier ..................... A61B 5/165 |
| 2022/0254176 | A1* | 8/2022 | Utsugida ............... G16H 40/63 |
| 2022/0294971 | A1* | 9/2022 | Dahlgren ............ G06F 18/2178 |
| 2022/0294992 | A1* | 9/2022 | Manzari ............... H04N 23/632 |
| 2022/0318541 | A1* | 10/2022 | Dai ..................... G02B 27/0172 |

FOREIGN PATENT DOCUMENTS

| | | |
|---|---|---|
| CN | 108962240 A | 12/2018 |
| CN | 109475294 A | 3/2019 |
| CN | 109588060 A | 4/2019 |
| CN | 110570864 A | 12/2019 |
| CN | 111048062 A | 4/2020 |
| CN | 111242354 A | 6/2020 |
| CN | 111727438 A | 9/2020 |
| EP | 3182349 A2 | 6/2017 |
| EP | 3327616 A1 | 5/2018 |
| GB | 2447246 A | 9/2008 |
| TW | I695312 B | 6/2020 |
| TW | M596382 U | 6/2020 |
| WO | 2019194863 A1 | 10/2019 |

OTHER PUBLICATIONS

International Search Report and Written Opinion for PCT Application No. PCT/US2020/055374, mailed on Jun. 18, 2021, 16 pages.
International Search Report and Written Opinion for PCT Application No. PCT/US2020/055378, mailed on Jun. 17, 2021, 23 pages.
Jagatheesan, et al., "Hierarchical Automatic Speech Recognition Powered by Data Infrastructure", The 11th Annual IEEE Consumer Communications and Networking Conference—Demos, 2014, pp. 1140-1141.
Lu, et al., "Watchar: 6-DOF Tracked Watch for AR Interaction", 2020, 2 pages.
Wang, et al., "Hierarchical Convolutional Neural Network for Face Detection", SpringerLink, ICIG 2015: Image and Graphics, retrieved on Jul. 16, 2020 from https://link.springer.com/chapter/10.1007/978-3-319-21963-9_34, 16 pages.
Communication pursuant to Article 94(3) EPC for European Application No. 20803695.4, mailed Sep. 19, 2024, 6 pages.
First Office Action (with English translation) for Chinese Application No. 202080035869.3, mailed Aug. 21, 2024, 29 pages.
De Godoy, et al., "Paws: A Wearable Acoustic System for Pedestrian Safety", 2018 IEEE/ACM Third International Conference on Internet-of-Things Design and Implementation, 2018, pp. 237-248.
Xia, et al., "Improving Pedestrian Safety in Cities Using Intelligent Wearable Systems", IEEE Internet of Things Journal, vol. 6, No. 5, Oct. 2019, pp. 7497-7514.
First Office Action with English translation for Chinese Application No. 202080035680.4, mailed Mar. 14, 2025, 26 pages.

* cited by examiner

DISTRIBUTED SENSOR DATA PROCESSING USING MULTIPLE CLASSIFIERS ON MULTIPLE DEVICES

CROSS-REFERENCE TO RELATED APPLICATION

This application is a 35 U.S.C. § 371 National Phase Entry Application from PCT/US2020/055378, filed on Oct. 13, 2020, entitled "DISTRIBUTED SENSOR DATA PROCESSING USING MULTIPLE CLASSIFIERS ON MULTIPLE DEVICES", the disclosure of which is incorporated herein by reference in its entirety.

FIELD

This disclosure relates to a distributed sensor data processing using multiple classifiers on multiple devices.

BACKGROUND

Computing devices (e.g., wearable devices, smartglasses, smart speakers, action cameras, etc.) are often relatively compact devices, and in some examples, may be on or around the body of a person for an extended period of time. However, computer processing requirements for processing sensor data (e.g., image data, audio data) can be relatively high especially for devices that include display and perception capabilities. For example, a device may perform energy-intensive operations (e.g., audio and/or image processing, computer vision, etc.) that requires a number of circuit components, which can cause several challenges. For example, the device may generate a relatively large amount of heat, thereby making the device uncomfortable to be in proximity to the skin for extended periods of time. In addition, the amount of circuit components (including batteries) adds weight to the device, thereby increasing the discomfort of wearing the device over an extended period of time. Further, the energy-intensive operations (in conjunction with the limitations on battery capacity) can cause the battery life to be relatively short. As such, some conventional devices can be used for only short durations throughout the day.

SUMMARY

This disclosure relates to a low-power device (e.g., smartglasses, wearable watches, portable action cameras, security cameras, smart speakers, etc.) that connects to a computing device (e.g., smartphone, laptop, tablet, etc.) over a wireless connection, where energy-intensive operations are offloaded to the computing device (or a server computer connected to the computing device), which can cause improvement to the device's performance (e.g., power, bandwidth, latency, computing capabilities, machine learning precision, etc.) and the user's experience. In some examples, the wireless connection is a short-range wireless connection such as a Bluetooth connection or near field communication (NFC) connection. In some examples, the low-power device includes a head-mounted display device such as smartglasses. However, the techniques discussed herein may be applied to other types of low-power devices such as portable action cameras, security cameras, smart doorbells, smart watches, etc.

According to an aspect, a method for distributed sound recognition using a wearable device includes receiving, via a microphone of the wearable device, audio data, detecting, by a sound classifier of the wearable device, whether or not the audio data includes a sound of interest, where the sound classifier executes a first machine learning (ML) model, and transmitting, via a wireless connection, the audio data to a computing device in response to the sound of interest being detected within the audio data, where the audio data is configured to be used by a second ML model for further sound classification.

According to an aspect, a non-transitory computer-readable medium storing executable instructions that when executed by at least one processor cause the at least one processor to receive audio data via a microphone of a wearable device, detect, by a sound classifier of the wearable device, whether or not the audio data includes a sound of interest, where the sound classifier is configured to execute a first machine learning (ML) model, and transmit, via a wireless connection, the audio data to a computing device in response to the sound of interest being detected within the audio data, where the audio data is configured to be used by a second ML model on the computing device for further sound classification.

According to an aspect, a wearable device for distributed sound recognition includes a microphone configured to capture audio data, a sound classifier configured to detect whether or not the audio data includes a sound of interest, the sound classifier including a first machine learning (ML) model, and a radio frequency (RF) transceiver configured to transmit the audio data to a computing device via a wireless connection in response to the sound of interest being detected within the audio data, where the audio data is configured to be used by a second ML model to translate the sound of interest to text data.

According to an aspect, a computing device for sound recognition including at least one processor, and a non-transitory computer-readable medium storing executable instructions that when executed by the at least one processor cause the at least one processor to receive, via a wireless connection, audio data from a wearable device, the audio data having a sound of interest detected by a sound classifier executing a first machine-learning (ML) model, determine whether to translate the sound of interest to text data using a sound recognition engine on the computing device, translate, by the sound recognition engine, the sound of interest to the text data in response to the determination to use the sound recognition engine on the computing device, the sound recognition engine configured to execute a second ML model, and transmit, via the wireless connection, the text data to the wearable device.

According to an aspect, a method for distributed image recognition using a wearable device includes receiving, via at least one imaging sensor of the wearable device, image data, detecting, by an image classifier of the wearable device, whether or not an object of interest is included within the image data, the image classifier executing a first machine-learning (ML) model, and transmitting, via a wireless connection, the image data to a computing device, the image data configured to be used by a second ML model on the computing device for further image classification.

According to an aspect, a non-transitory computer-readable medium storing executable instructions that when executed by at least one processor cause the at least one processor to receive image data from one imaging sensor on a wearable device, detect, by an image classifier of the wearable device, whether or not an object of interest is included within the image data, the image classifier configured to execute a first machine-learning (ML) model, and transmit, via a wireless connection, the image data to a computing device, the image data configured to be used by a second ML model on the computing device to compute object location data, the object location data identifying a location of the object of interest in the image data.

According to an aspect, a wearable device for distributed image recognition includes at least one imaging sensor configured to capture image data, an image classifier configured to detect whether or not an object of interest is included within the image data, the image classifier configured to execute a first machine-learning (ML) model, and a radio frequency (RF) transceiver configured to transmit, via a wireless connection, the image data to a computing device, the image data configured to be used by a second ML model on the computing device to compute object location data, the object location data identifying a location of the object of interest in the image data.

According to an aspect, a computing device for distributed image recognition includes at least one processor, and a non-transitory computer-readable medium storing executable instructions that when executed by the at least one processor cause the at least one processor to receive, via a wireless connection, image data from a wearable device, the image data having an object of interest detected by an image classifier executing a first machine-learning (ML) model, compute object location data based on the image data using a second ML model, the object location data identifying a location of the object of interest in the image data, and transmit, via the wireless connection, the object location data to the wearable device.

DETAILED DESCRIPTION

Figure 1:
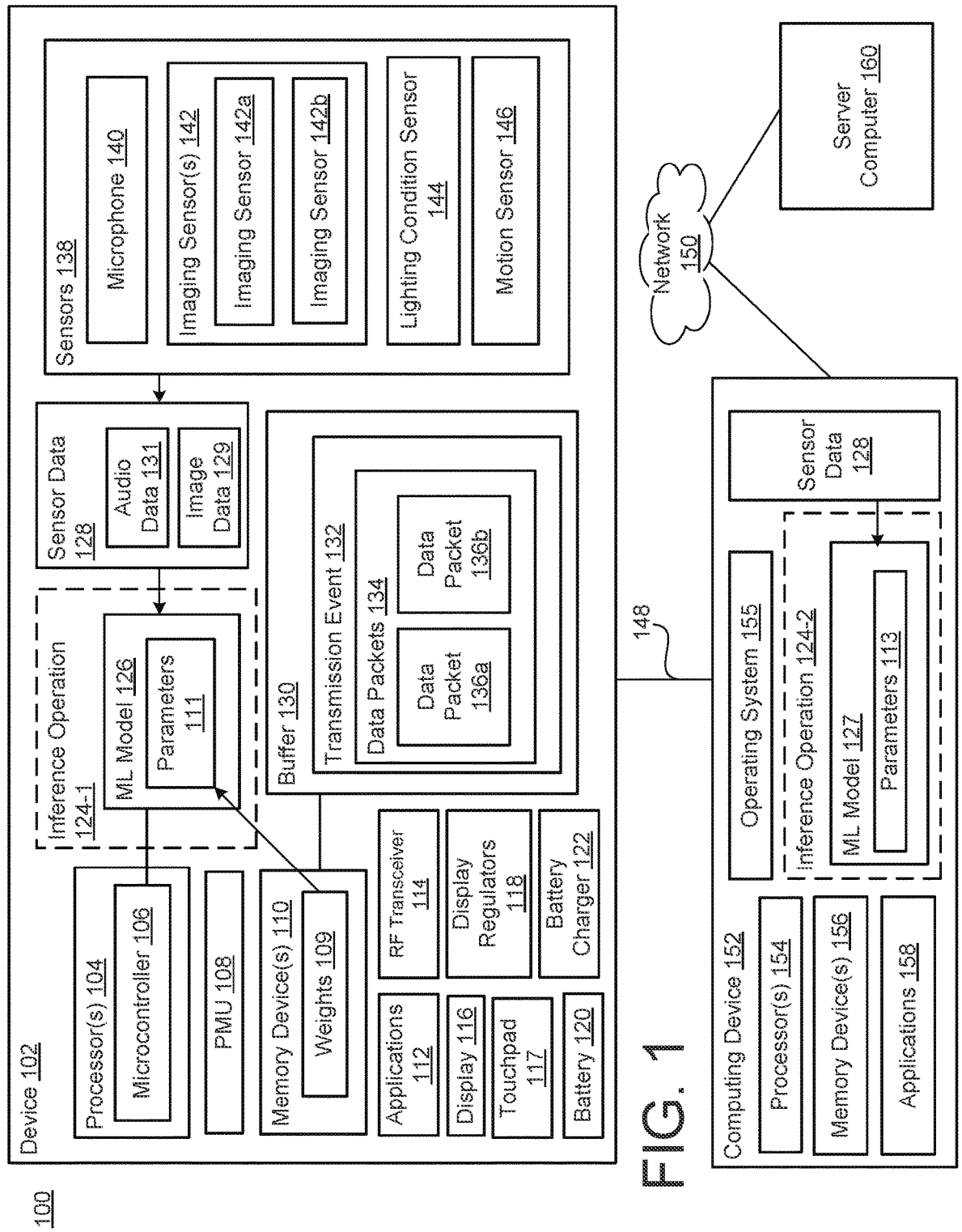
FIG. 1 illustrates a system for distributing image and/or audio processing across multiple devices including a wearable device and a computing device according to an aspect.

For sensor data captured by one or more sensors on the wearable device, the wearable device performs a portion of audio and/or image processing (e.g., the lower energy-intensive operation(s)) and the computing device (and/or the server computer and/or other multiple devices) performs other portion(s) of the audio and/or image processing (e.g., the higher energy-intensive operation(s)). For example, the wearable device can intelligently detect, using a relatively small machine-learning (ML) model, the presence of sensor data (e.g., whether audio data includes a sound of interest such as speech, music, an alarm, a hot-word for a voice command, etc. or whether image data includes an object of interest such as objects, text, bar codes, facial features, etc.), and, if so, can stream the sensor data to the computing device, over the wireless connection, to perform more complex audio and/or image processing using a relatively larger ML model. The results of the more complex audio and/or image processing can be provided back to the wearable device via the wireless connection, which can cause the wearable device to perform an action (including additional image/audio processing) and/or can cause the wearable device to render the results on the wearable device's display.

In some examples, this hybrid architecture may enable a compact form-factor with less circuit components in a wearable device such as a head-mounted display device (e.g., smartglasses). For example, since the system offloads more energy-intensive operations to the connected computing device(s) (and/or server computer), the wearable device may include less powerful/complex circuits. In some examples, the wearable device's architecture may enable a relatively compact printed circuit board within the frame of the eyeglasses, where the printed circuit board includes circuitry that is relatively low in power while still being able to execute wearable applications that are based on image processing and/or computer vision such as object classification, optical character recognition (OCR), and/or barcode decoding. As a result, battery life may be increased so that the user can use the wearable device over extended periods of time.

In some examples, sound recognition operations are distributed between the wearable device and the computing device (and potentially a server computer or other computing devices). For example, the wearable device includes a sound classifier (e.g., a small ML model) configured to detect whether or not a sound of interest (e.g., speech, music, alarm, etc.) is included within the audio data captured by a microphone on the wearable device. If not, the sound classifier continues to monitor the audio data to determine if the sound of interest is detected. If so, the wearable device can stream the audio data (e.g., raw sound, compressed sound, sound snippet, extracted features, and/or audio parameters, etc.) to the computing device over the wireless connection. The sound classifier may save power and latency through its relatively small ML model. The computing device includes a more powerful sound recognition engine (e.g., a more powerful classifier) that executes a larger ML model to translate (or convert) the audio data to text data (or other forms of data), where the computing device transmits the text data back to the wearable device via the wireless connection to be displayed on the wearable device's display and/or auditorily read back to the user. In some examples, the computing device is connected to a server computer over a network (e.g., the Internet), and the computing device transmits the audio data to the server computer, where the server computer executes a larger ML model to translate the audio data to text data (e.g., in cases of translating into a different language). Then, the text data is routed back to the computing device and then to the wearable device for display.

In some examples, image recognition operations are distributed between the wearable device and the computing device. In some examples, the image recognition operations include facial detection and tracking. However, the image recognition operations may include operations to detect (and track) other regions of interest in image data such as objects, barcodes, and/or text. The wearable device includes an image classifier (e.g., a small ML model) configured to detect whether or not an object of interest (e.g., facial features, text, OCR code, etc.) are included within the image data captured by one or more imaging sensors on the wearable device. If so, the wearable device may transmit an image frame (that includes the object of interest) to the computing device over the wireless connection. The computing device includes a more powerful object detector (e.g., a more power classifier) that executes a larger ML model to calculate object location data (e.g., bounding box dataset) that identifies a location of the detected object of interest, where the computing device transmits the object location data back to the wearable device. The wearable device uses one or more low-complexity tracking mechanisms (e.g., inertial measurement unit (IMU)-based warping, blob detection, optical flow, etc.) to propagate the object location data for subsequent image frames captured on the wearable device. The wearable device may compress and send the cropped regions to the computing device, where the object detector on the computing device may perform object detection on the cropped regions and send updated object location data back to the wearable device.

In some examples, perception operations with multi-resolutions are distributed between the wearable device and the computing device. Perception operations may include always-on sensing and sensing a voice-input request (e.g., hot-word detection). For example, the wearable device may include a low-power/low-resolution (LPLR) camera and a high-power/high-resolution (HPHR) camera. In some examples, the wearable device may include the image classifier that executes a small ML model to detect objects of interest (e.g., faces, text, barcodes, buildings, etc.) from image data captured by the LPLR camera. If an object of interest is detected, the HPHR camera may be triggered to capture one or more image frames with a higher quality (e.g., higher resolution, less noise, etc.). Higher quality images may be required for some applications.

Then, the image frame(s) from the HPHR camera may be transmitted to the computing device over the wireless connection, where the computing device executes a larger ML model to perform more complex image recognition operations on the image frame(s) with the higher quality. In some examples, the operations may be similar to the object detection example described above, where object location data (e.g., bounding box dataset) is computed and sent to the wearable device, and the wearable device uses one or more tracking mechanisms to propagate the object location data to subsequent frames, and then the wearable device crops and compresses image regions to be sent back to the computing device for further processing. In some examples, a stream of images of a product can be used to capture label text or barcodes and look up associated product information (e.g., price, shopping suggestions, comparable products, etc.). This information can be shown on a display surface present on the wearable device or read back to the user auditorily.

In terms of sensing a voice-input request, the wearable device may include a voice command detector that executes a small ML model (e.g., a gatekeeping model) to continuously (e.g., periodically) process microphone samples for an initial portion of a hot-word (e.g., "ok G" or "ok D"). If the voice command detector detects that initial portion, the voice command detector may cause a buffer to capture the subsequent audio data. Also, the wearable device may transmit a portion of the buffer (e.g., 1-2 seconds of audio from the head of the buffer) to the computing device over the wireless connection, where the computing device includes a hot-word recognition engine having a larger ML model to perform the full hot-word recognition. If the utterance is a false positive, the computing device may transmit a disarm command to the wearable device, which discards the contents of the buffer. If the utterance is a true positive, the rest of the audio buffer is transmitted to the computing device for automatic speech recognition and user-bound response generation.

The systems and techniques described herein may reduce the wearable device's power consumption, increase the battery life, decrease the amount of heat generated by the wearable device, and/or decrease the amount of circuit components within the wearable device (which can cause the weight to be decreased), which may cause the wearable device to be used for extended periods of time. In some examples, in terms of power, the systems and techniques described herein can extend the wearable device's battery life to an extended period of time (e.g., five to fifteen hours, or more than fifteen hours). In contrast, some conventional smartglasses and other image/audio processing products may have only a few hours of usage.

In some examples, in terms of bandwidth, the systems and techniques described herein may distribute computation operations (e.g., inference operations) across the wireless connection using gatekeeping models (e.g., small classifiers, binary classifiers, etc.) to limit unnecessary transmission, which can reduce the latency and reduce power usage. In some examples, in terms of latency, the systems and techniques described herein may enable the use of inference both near the wearable device's sensors and across the components of the computing device (and potentially the server computer), which can provide flexibility to tune performance to meet the requirements of various applications. The ML decisions can occur dynamically as application use and power (e.g., remaining battery life) or computing requirements change under use. In some examples, in terms of computing capabilities, the systems and techniques described herein may provide a flexible use of computing resources to meet application requirements.

FIG. 1 illustrates a system 100 for distributing image and/or audio processing on sensor data 128 across multiple devices including a device 102, a computing device 152, and/or a server computer 160. In some examples, the sensor data 128 is real-time sensor data or near real-time sensor data (e.g., data collected from one or more sensors 138 in real-time or near real-time). In some examples, image and/or audio processing on sensor data 128 may be distributed among the device 102 and the computing device 152. In some examples, the image and/or audio processing on sensor data 128 may be distributed among any two or more of the device 102, the computing device 152, or the server computer 160 (or any combination thereof). In some examples, the system 100 includes multiple devices 102 and/or multiple computing devices 152, where each device executes a classifier that renders a decision on if and what data to relay to the next classifier, which may be on the same device or a different device.

The device 102 is configured to be connected to the computing device 152 via a wireless connection 148. In some examples, the wireless connection 148 is a short-range communication link such as near-field communication (NFC) connection or Bluetooth connection. The device 102 and the computing device 152 may exchange information via the wireless connection 148. In some examples, the wireless connection 148 defines an application-layer protocol that is implemented using protocol buffers with message types for drawing graphic primitives, configuring sensors 138 and peripherals, and changing device modes. In some examples, the application-layer protocol defines another set of message types that can transmit sensor data 128 and remote procedure call (RPC) return values back to the computing device 152.

The computing device 152 may be coupled to the server computer 160 over a network 150. The server computer 160 may be computing devices that take the form of a number of different devices, for example a standard server, a group of such servers, or a rack server system. In some examples, the server computer 160 is a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. In some examples, the device 102 is also configured to be connected to the server computer 160 over the network 150.

With respect to audio and/or image processing for sensor data 128 captured by one or more sensors 138 on the device 102 in real-time or near real-time, a portion of audio and/or image processing (e.g., the lower energy-intensive operation(s)) is performed at the device 102, and other portion(s) of the audio and/or image processing (e.g., the higher energy-intensive operation(s)) are performed at the computing device 152 (and/or the server computer 160). In some examples, another portion of the audio and/or image processing is performed at another device. In some examples, another portion of the audio and/or image processing is performed at yet another device, and so forth. In some examples, the sensor data 128 includes audio data 131. In some examples, the sensor data 128 includes image data 129. In some examples, the sensor data 128 includes audio data 131 and image data 129.

The device 102 can intelligently detect the presence of certain types of data within the sensor data 128 captured by the sensor(s) 138. In some examples, the device 102 can detect whether audio data 131 captured by a microphone 140 includes a sound of interest such as speech, music, alarm, or at least a portion of a hot-word for command detection, etc. In some examples, the device 102 can detect whether image data 129 includes an object of interest (e.g., objects, text, barcodes, facial features, etc.). If the device 102 detects the relevant data within the sensor data 128, the device 102 can stream the sensor data 128 to the computing device 152, over the wireless connection 148, to perform more complex audio and/or image processing. In some examples, the device 102 can stream the image data 129 to the computing device 152. In some examples, the device 102 can stream the audio data 131 to the computing device 152. In some examples, the device 102 can stream both the audio data 131 and the image data 129 to the computing device 152.

In some examples, the device 102 compresses the audio data 131 and/or the image data 129 before transmission to the computing device 152. In some examples, the device 102 extracts features from the sensor data 128 and sends the extracted features to the computing device 152. In some examples, the device 102 extracts features from the sensor data 128 and sends the extracted features to the computing device 152. For example, the extracted features may include sound intensity, computed angle-of-arrival (e.g., what direction the sound came from), and/or the type of the sound (e.g., speech, music, alarm, etc.). In some examples, the extracted features may include compressed encoding which can save transmission bandwidth for a particular type of sound. The results of the more complex audio and/or image processing performed at the computing device 152 can be provided back to the device 102 via the wireless connection 148 to cause the device 102 to perform an action (including further audio and/or image processing), cause the device 102 to render the results on a display 116 of the device 102, and/or cause the device 102 to provide the results auditorily.

In some examples, the device 102 is a display device capable of being worn on or in proximity to the skin of a person. In some examples, the device 102 is a wearable device. In some examples, the device 102 is a head mounted display (HMD) device such as an optical head-mounted display (OHMD) device, a transparent heads-up display (HUD) device, an augmented reality (AR) device, or other devices such as googles or headsets having sensors, display, and computing capabilities. In some examples, the device 102 is smartglasses. Smartglasses is an optical head-mounted display designed in the shape of a pair of eyeglasses. For example, smartglasses are glasses that add information (e.g., projects a display 116) alongside what the wearer views through the glasses. In some examples, superimposing information (e.g., digital images) onto a field of view may be achieved through smart optics. Smartglasses are effectively wearable computers which can run self-contained mobile apps (e.g., the applications 112). In some examples, smartglasses may be hands-free and can communicate with the Internet via natural language voice commands, while others use touch buttons. In some examples, the device 102 may include any type of low-power device. In some examples, the device 102 includes a security camera. In some examples, the device 102 includes an action camera. In some examples, the device 102 includes a smart watch. In some examples, the device 102 includes a smart doorbell. As indicated above, the system 100 may include multiple devices 102 (e.g., a smart watch, smartglasses, etc.), where each device 102 is configured to execute a classifier that can perform image/audio processing, and then route data to the next classifier in the network of classifiers.

The device 102 may include one or more processors 104, which may be formed in a substrate configured to execute one or more machine executable instructions or pieces of software, firmware, or a combination thereof. In some examples, the processor(s) 104 are included as part of a system on chip (SOC). The processor(s) 104 can be semiconductor-based—that is, the processors can include semiconductor material that can perform digital logic. The processor(s) 104 includes a microcontroller 106. In some examples, the microcontroller 106 is a subsystem within the SOC and can include a process, memory, and input/output peripherals. In some examples, the microcontroller 106 is a dedicated hardware processor that executes a classifier. The device 102 may include a power management unit (PMU) 108. In some examples, the PMU 108 is integrated with or included within the SOC. The microcontroller 106 is configured to execute a machine-learning (ML) model 126 to perform an inference operation 124-1 related to audio and/or image processing using sensor data 128. As further discussed below, the relatively small size of the ML model 126 can save power and latency. In some examples, the device 102 includes multiple microcontrollers 106 and multiple ML models 126 that perform multiple inference operations 124-1, which can communicate with each other and/or other devices (e.g., computing device(s) 152 and/or server computer 160).

The device 102 includes one or more memory devices 110. In some examples, the memory devices 110 include flash memory. In some examples, the memory devices 110 may include a main memory that stores information in a format that can be read and/or executed by the processor(s) 104 including the microcontroller 106. The memory devices 110 may store weights 109 (e.g., inference weights, or model weights) for the ML model 126 that is executed by the microcontroller 106. In some examples, the memory devices 110 may store other assets such as fonts and images.

In some examples, the device 102 includes one or more applications 112, which can be stored in the memory devices 110, and that, when executed by the processor(s) 104, perform certain operations. The applications 112 may widely vary depending on the use case, but may include browser applications to search web content, sound recognition applications such as speech-to-text applications, image recognition applications (including object and/or facial detection (and tracking) applications, barcode decoding applications, text OCR applications, etc.), and/or other applications that can enable the device 102 to perform certain functions (e.g., capture an image, record a video, get directions, send a message, etc). In some examples, the applications 112 include an email application, a calendar application, a storage application, a voice call application, and/or a messaging application.

The device 102 includes a display 116, which is a user interface that displays information. In some examples, the display 116 is projected onto the field of view of the user. In some examples, the display 116 is a built-in lens display. The display 116 may include a liquid crystal display (LCD), a light-emitting diode (LED) display, an organic light-emitting display (OLED), an electro-phoretic display (EPD), or a micro-projection display adopting an LED light source. In some examples, the display 116 may provide a transparent or semi-transparent display such that the user wearing the glasses can see images provided by the display 116 but also information located in the field of view of the smartglasses behind the projected images. In some examples, the device 102 includes a touch pad 117 that allows the user to control the device 102 (e.g., which can allow swiping through an interface displayed on the display 116). The device 102 includes a battery 120 configured to provide power to the circuit components, one or more radio frequency (RF) transceivers 114 to enable communication with the computing device 152 via the wireless connection 148 and/or the server computer 160 via the network 150, a battery charger 122 configured to control the charging of the battery 120, and one or more display regulators 118 that controls information displayed by the display 116.

The device 102 includes a plurality of sensors 138 such as a microphone 140 configured to capture audio data 131, one or more imaging sensors 142 configured to capture image data, a lighting condition sensor 144 configured to obtain lighting condition information, and/or a motion sensor 146 configured to obtain motion information. The microphone 140 is a transducer device that converts sound into an electrical signal, which is represented by the audio data 131. The light condition sensor 144 may detect the amount of light exposure. In some examples, the lighting condition sensor 144 includes an ambient light sensor that detects the amount of ambient light that is present, which can be used to ensure that image data 129 is captured with a desired signal-to-noise ratio (SNR). However, the lighting condition sensor 144 may include other types of photometric (or colorimeter) sensors. The motion sensor 146 may obtain motion information, which may include blur estimation information. The motion sensor 146 can be used for monitoring device movement such as tilt, shake, rotation, and/or swing and/or for determining blur estimation.

The imaging sensors 142 are sensors (e.g., cameras) that detect and convey information used to make an image, which is represented by the image data 129. The imaging sensors 142 can take pictures and record video. In some examples, the device 102 includes a single imaging sensor 142. In some examples, the device 102 includes multiple imaging sensors 142. In some examples, the imaging sensors 142 include an imaging sensor 142a and an imaging sensor 142b. The imaging sensor 142a may be considered a low power, low resolution (LPLR) image sensor. The imaging sensor 142b may be considered a high power, high resolution (HPHR) image sensor. An image captured by imaging sensor 142b has a higher quality (e.g., higher resolution, lower noise) than an image captured by imaging sensor 142a. In some examples, the device 102 includes more than two imaging sensors 142.

In some examples, the imaging sensor 142a is configured to obtain image data 129 while the device 102 is activated (e.g., continuously or periodically captures image data 129 while the device 102 is activated). In some examples, the imaging sensor 142a is configured to operate as an always-on sensor. In some examples, the imaging sensor 142b is activated (e.g., for a short duration) in response to the detection of an object of interest, as further discussed below.

The computing device 152 may be any type of computing device capable of being wirelessly connected to the device 102. In some examples, the computing device 152 is a mobile computing device. In some examples, the computing device 152 is a smartphone, a tablet, or a laptop computer. In some examples, the computing device 152 is a wearable device. The computing device 152 may include one or more processors 154 formed in a substrate configured to execute one or more machine executable instructions or pieces of software, firmware, or a combination thereof. The processors 154 can be semiconductor-based—that is, the processors can include semiconductor material that can perform digital logic.

The computing device 152 may include one or more memory devices 156. The memory devices 156 may include a main memory that stores information in a format that can be read and/or executed by the processors 154. The operating system 155 is a system software that manages computer hardware, software resources, and provides common services for computing programs. Although not shown in FIG. 1, the computing device 152 can include a display (e.g., a touchscreen display, an LED display, etc.) that can display a user interface for an application 158 that is being executed by the computing device 152. The applications 158 may include any type of computer program executable by the operating system 155. The applications 158 may include mobile applications, e.g., software programs that are developed for a mobile platform or mobile device.

In some examples, the audio and/or image processing that is performed on the sensor data 128 obtained by the sensor(s) 138 are referred to as inference operations (or ML inference operations). An inference operation (e.g., inference operation 124-1 or inference operation 124-2) may refer to an audio and/or image processing operation, step, or sub-step that involves a ML model that makes (or leads to) one or more predictions. Certain types of audio and/or image processing use ML models to make predictions. For example, machine learning may use statistical algorithms that learn data from existing data, in order to render a decision about new data, which is a process called inference. In other words, inference refers to the process of taking a model that is already trained and using that trained model to make predictions. Some examples of inference may include sound recognition (e.g., speech-to-text recognition), image recognition (e.g., facial recognition and tracking, etc.), and/or perception (e.g., always-on sensing, voice-input request sensing, etc.).

In some examples, a ML model includes one or more neural networks. Neural networks transform an input, received by the input layer, transform it through a series of hidden layers, and produce an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process. In some examples, the neural network is a convolutional neural network, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks.

With respect to a particular inference type, the device 102 may perform one or more parts of the inference to intelligently detect the presence of sensor data 128 (e.g., whether audio data 131 includes a sound of interest such as speech, an alarm, or at least a portion of a hotword, and/or whether image data 129 includes an object of interest (e.g., facial features, text, objects, bar codes, etc.)) and, if so, then transmits the sensor data 128, over the wireless connection 148, to the computing device 152, where computing device 152 performs one or more other parts of the ML inference (e.g., the more complex parts of audio and/or image processing) using the sensor data 128. In other words, the inference operations may be distributed among the device 102 and the computing device 152 (and potentially the server computer 160) so that the energy-intensive operations are performed at the more powerful computing device (e.g., the computing device 152 or the server computer 160) as opposed to the relatively small computing device (e.g., the device 102).

In some examples, the system 100 may include other devices (e.g., besides the device 102, the computing device 152, and the server computer 160), where one or more of these other devices may execute one or more classifiers (where each classifier executes a ML model related to object/sound recognition). For example, the system 100 may have one or more classifiers on the device 102, one or more wearable devices (e.g., one or more devices 102) and/or one or more classifiers on the computing device 152. Further, the data may be sent to the server computer 160 for server-side processing—which may have additional classification steps. As such, in some examples, the system 100 may include a network of classifiers that analyze audio/camera streams and make decisions on if and what to relay to the next node (or classifier).

In some examples, the microcontroller 106 of the device 102 may execute an inference operation 124-1 using sensor data 128 (e.g., audio data 131 from the microphone 140 and/or image data 129 from one or more of the imaging sensors 142) and the ML model 126 stored on the device 102. In some examples, the ML model 126 may receive the sensor data 128 as an input, and detect whether or not the sensor data 128 has a classification in which the ML model 126 is trained to classify (e.g., whether audio data 131 includes a sound of interest or whether the image data 129 includes an object of interest). In some examples, the ML model 126 is a sound classifier that can evaluate incoming sound for specific criteria (e.g., frequency, amplitude, feature detection, etc.). In some examples, the analyzed criteria determines if audio data (e.g., raw sound, compressed sound, sound snippet, audio parameters, etc.) should be sent to other device(s) (including computing device 152, server computer 160, etc.), which does further classification.

In some examples, the ML model 126 is a speech classifier (e.g., a binary speech classifier) that detects whether the audio data 131 includes speech or does not include speech. In some examples, the ML model 126 is an image object classifier (detector) that detects whether the image data 129 includes an object of interest or does not include an object of interest. In some examples, the ML model 126 is an object classifier that detects whether the image data 129 includes facial features or does not include facial features. In some examples, the ML model 126 is a classifier that determines whether the audio data 131 includes at least a portion of a hot-word for a voice command.

If the output of the ML model 126 indicates that the classification has been detected, the RF transceiver 114 of the device 102 may transmit the sensor data 128 to the computing device 152 via the wireless connection 148. In some examples, the device 102 may compress the sensor data 128, and then transmit the compressed sensor data 128 to the computing device 152. Then, the computing device 152 is configured to execute an inference operation 124-2 using the sensor data 128 (received from the device 102) and the ML model 127 stored on the computing device 152. In some examples, in terms of sound recognition (e.g., speech-to-text processing), the ML model 127 is used to convert audio data 131 to text, where the results are transmitted back to the device 102. In some examples, in terms of hot-word command recognition, the ML model 127 is used to perform full hot-word command recognition on the audio data 131 received from the device 102. In some examples, in terms of image processing, the ML model 127 is used to compute object location data (identifying a location of the object of interest in the image data), where the results are transmitted back to the device 102 for further image processing, which is further described later in the specification.

However, generally, the inference operation 124-2 may refer to an audio and/or image processing operation that involves a ML model that is different from the inference operation 124-1. In some examples, the inference operations include sound recognition operations, where the inference operation 124-1 refers to a first sound recognition operation that is executed using the ML model 126, and the inference operation 124-2 refers to a second sound recognition that is executed using the ML model 127. In some examples, the inference operations include image recognition operations, where the inference operation 124-1 refers to a first image recognition operation that is executed using the ML model 126, and the inference operation 124-2 refers to a second image recognition operation that is executed using the ML model 127. In some examples, the inference operations include perception sensing operations (e.g., always-on sensing, voice command sensing (e.g., hotword recognition), etc.), where the inference operation 124-1 refers to a first perception sensing operation that is executed using the ML model 126, and the inference operation 124-2 refers to a second perception sensing operation that is executed using the ML model 127.

The ML model 126 may have a size less than (e.g., substantially less than) a size of the ML model 127. In some examples, the ML model 126 may be required to perform less computational operations to make a prediction as compared to the ML model 127. In some examples, the size of a particular ML model may be represented by the number of parameters required for that model to make a prediction. A parameter is a configuration variable that is internal to the ML model and whose value can be estimated from the given data. The ML model 126 may include parameters 111. For example, the ML model 126 may define a number of parameters 111 that are required for the ML model 126 to make a prediction. The ML model 127 includes parameters 113. For example, the ML model 127 may define a number of parameters 113 that are required for the ML model 127 to make a prediction. The number of parameters 111 may be less than (e.g., substantially less than) the number of parameters 113. In some examples, the number of parameters 113 is at least ten times greater than the number of parameters 111. In some examples, the number of parameters 113 is at least one hundred times greater than the number of parameters 111. In some examples, the number of parameters 113 is at least one thousand times greater than the number of parameters 111. In some examples, the number of parameters 113 is at least one million times greater than the number of parameters 111. In some examples, the number of parameters 111 is in a range between 10k and 100k. In some examples, the number of parameters 111 is less than 10k. In some examples, the number of parameters 113 is in a range between 1M and 10M. In some examples, the number of parameters 113 is greater than 10M.

In some examples, sound recognition operations (e.g., speech, alarm, or generally any type of sound) are distributed between the device 102 and the computing device 152. In some examples, the sound recognition operations are distributed between the device 102 and the computing device 152. For example, the microcontroller 106 is configured to execute an inference operation 124-1 by invoking the ML model 126 to detect whether or not a sound of interest is included within audio data 131 captured by the microphone 140 on the device 102. The ML model 126 may be a classifier that classifies the audio data 131 as containing the sound of interest or not containing the sound of interest. For example, the ML model 126 receives the audio data 131 from the microphone 140 and computes a prediction on whether the audio data 131 includes the sound of interest. If the sound of interest is not detected within the audio data 131 by the ML model 126, the ML model 126 continues to receive the audio data 131 from the microphone 140 as an input to compute a prediction on whether the sound of interest is detected within the audio data 131. If the sound of interest is detected within the audio data 131 by the ML model 126, the device 102 streams the audio data 131 (e.g., raw sound, compressed sound, sound snippet, and/or audio parameters, etc.) to the computing device 152 over the wireless connection 148. In some examples, the device 102 compresses the audio data 131, and then transmits the compressed audio data 131 to the computing device 152 over the wireless connection 148.

The computing device 152 receives the audio data 131 over the wireless connection 148 from the device 102 and executes an inference operation 124-2 by invoking the ML model 127. The ML model 127 may save power and latency through its relatively small ML model. The computing device 152 includes a more powerful sound recognition engine (e.g., another type of classifier) that executes a ML model 127 (e.g., a larger ML model) to convert the audio data 131 (potentially to text data), where the computing device 152 transmits the text data back to the device 102 via the wireless connection 148 to be displayed on the device's display. In some examples, the computing device 152 is connected to a server computer 160 over a network 150 (e.g., the Internet), and the computing device 152 transmits the audio data 131 to the server computer 160, where the server computer 160 executes a larger ML model to convert the audio data 131 to text data (e.g., in cases of translating into a different language). Then, the text data is routed back to the computing device 152 and then to the device 102 for display.

In some examples, image recognition operations are distributed between the device 102 and the computing device 152. In some examples, the image recognition operations include facial detection and tracking. However, the image recognition operations may include operations to detect (and track) other regions of interest in image data such as objects, text, and barcodes. The microcontroller 106 is configured to execute an inference operation 124-1 by invoking the ML model 126 to detect whether or not an object of interest is included within image data 129 captured by one or more imaging sensors 142 on the device 102. If so, the device 102 may transmit an image frame (that includes the object of interest) to the computing device 152 over the wireless connection 148. In some examples, device 102 compresses the image frame, and then transmits the compressed image frame to the computing device 152 over the wireless connection 148.

The computing device 152 is configured to execute an inference operation 124-2 by invoking the ML model 127 to perform a more complex image processing operation using the image data 129 such as calculating object location data (e.g., a bounding box dataset) identifying a location of the object of interest, where the computing device 152 transmits the object location data back to the device 102. The device 102 uses one or more low-complexity tracking mechanisms (e.g., IMU-based warping, blob detection, optical flow, etc.) to propagate the object location data for subsequent image frames captured on the device 102. The device 102 may compress and send the cropped regions to the computing device 152, where the computing device 152 may perform image classification on the cropped regions and send updated object location data back to the device 102.

In some examples, perception operations with multi-resolutions are distributed between the device 102 and the computing device 152. Perception operations may include always-on sensing and sensing a voice-input request (e.g., hot-word detection). In some examples, the imaging sensor 142*a* (e.g., the LPLR camera) is activated when the user is wearing the device 102 in order to capture image data 129 with relatively low resolution to search for regions of interest. For example, the microcontroller 106 is configured to perform an inference operation 124-1 by invoking the ML model 126 (using the image data 129 as an input to the ML model 126) to detect objects of interest (e.g., faces, text, barcodes, buildings, etc.). If an object of interest is detected, the imaging sensor 142*b* may be activated to capture one or more image frames having a higher resolution.

Then, the image data 129 with the higher resolution may be transmitted to the computing device 152 over the wireless connection 148. In some examples, the device 102 compresses the image data 129 with the higher resolution and transmits the compressed image data 129 over the wireless connection 148. The computing device 152 is configured to execute an inference operation 124-2 by invoking the ML model 127 (inputted with the image data 129 having the higher resolution) to perform image recognition. In some examples, the operations may be similar to the face detection example described above, where the object location data (e.g., bounding box dataset) is computed by the computing device 152 and sent to the device 102, and the device 102 uses one or more tracking mechanisms to propagate the object location data to subsequent frames, and then the device 102 crops and compresses image regions to be sent back to the computing device 152 for further image classification. In some examples, a stream of images of a product can be used to capture label text or barcodes and look up associated product information (e.g., price, shopping suggestions, comparable products, etc.). This information can be shown on a display 116 on the device 102 or read back to the user auditorily.

In terms of sensing a voice-input request, the microcontroller 106 is configured to execute an inference operation 124-1 by invoking the ML model 126 to continuously (e.g., periodically) process microphone samples (e.g., audio data 131) for an initial portion of a hot-word (e.g., "ok G" or "ok D"). If the ML model 126 detects that the initial portion, the microcontroller 106 may cause a buffer to capture the subsequent audio data 131. Also, the device 102 may transmit a portion of the buffer (e.g., 1-2 seconds of audio from the head of the buffer) to the computing device 152 over the wireless connection 148. In some examples, the portion of the buffer is compressed before transmitting to the computing device 152. The computing device 152 is configured to execute an inference operation 124-2 by invoking the ML model 127 to perform the full hot-word recognition using the audio data 131. If the utterance is a false positive, the computing device 152 may transmit a disarm command to the device 102, which discards the contents of the buffer. If the utterance is a true positive, the rest of the audio buffer is compressed and transmitted to the computing device 152 for automatic speech recognition and user-bound response generation.

In some examples, in order to increase the transmission efficiency, the device 102 may buffer multiple data packets 134 and transmit the data packets 134 as a single transmission event 132 to the computing device 152 over the wireless connection 148. For example, each transmission event 132 may correlate with a power consumption that causes power to be dissipated from the battery 120. In some examples, the device 102 determines the type of information to be transmitted to the computing device 152. In some examples, if the type of information to be transmitted to the computing device 152 relates to latency-dependent information (e.g., audio streaming), the device 102 may not buffer the audio data 131 but rather stream the audio data 131 without delay. In some examples, if the information to be transmitted is not latency-dependent information, the device 102 may store the information as one or more data packets 134 in a buffer 130 and transmit the information to the computing device 152 at a later time. The buffer 130 may be a portion of the memory device(s) 110. In some examples, other non-latency-dependent information may be combined with the existing data in the buffer 130, and the information contained in the buffer 130 may be transmitted to the computing device 152 as a single transmission event 132.

For example, the buffer 130 may include a data packet 136*a* and a data packet 136*b*. The data packet 136*a* may include information obtained at a first time instance, and the data packet 136*b* may include information obtained at a second time instance, where the second time instance is after the first time instance. However, instead of transmitting the data packet 136*a* and the data packet 136*b* as different transmission events 132, the device 102 may store the data packet 136*a* and the data packet 136*b* in the buffer 130 and transmit the data packet 136*a* and the data packet 136*b* as a single transmission event 132. In this manner, the number of transmission events 132 may be reduced, which may increase the energy efficiency of communicating information to the computing device 152.

Figure 2:
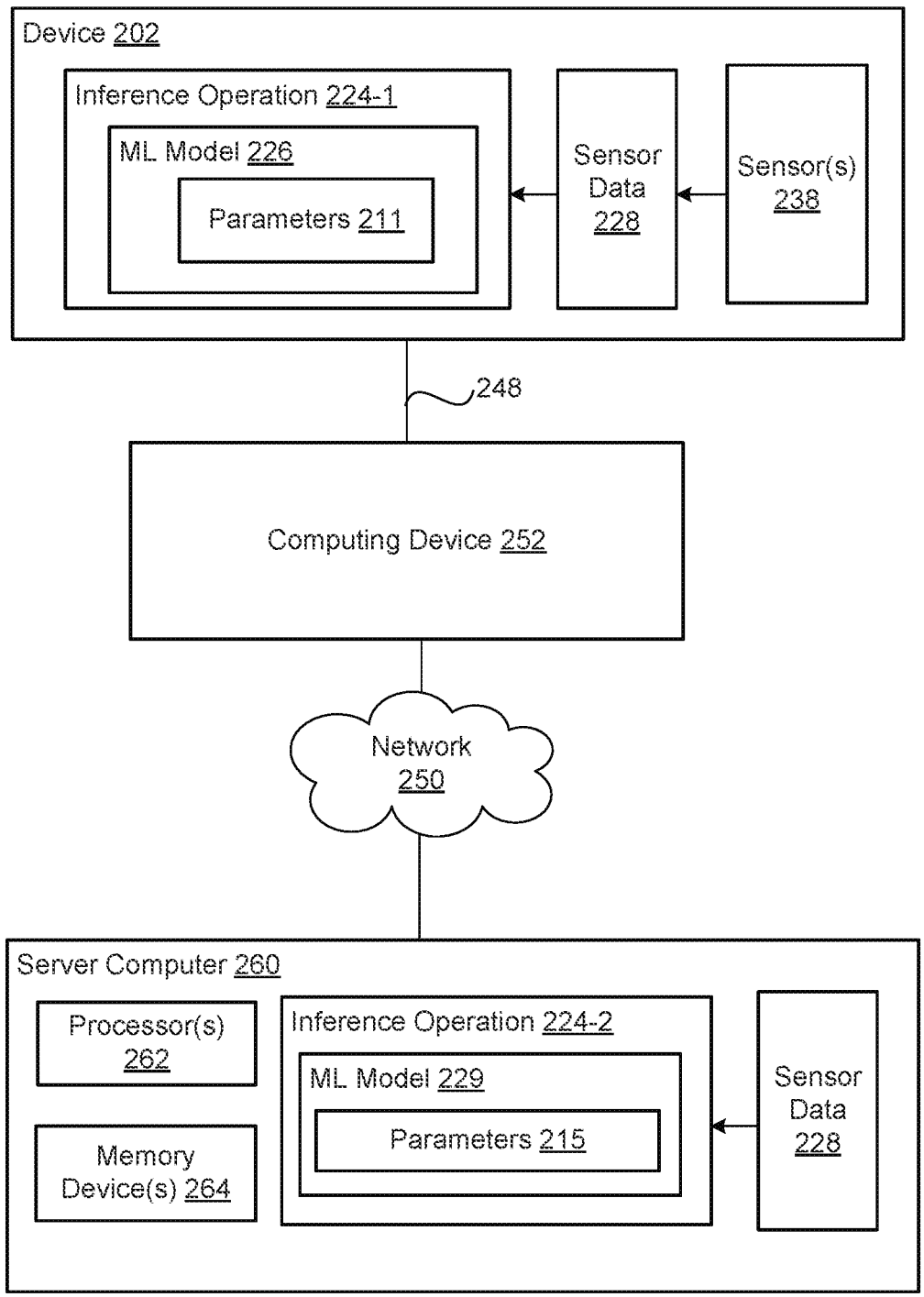
FIG. 2 illustrates a system for distributing image and/or audio processing across a wearable device and a server computer according to an aspect.

FIG. 2 illustrates a system 200 for distributing image and/or audio processing across multiple devices including a device 202, a computing device 252, and a server computer 260. The system 200 may be an example of the system 100 of FIG. 1 and may include any of the details disclosed with reference to those figures. The device 202 is connected to the computing device 252 over a wireless connection 248. In some examples, the device 202 is a head-mounted display device such as smartglasses. However, the device 202 may be other types of low-power devices as discussed herein. The computing device 252 is connected to the server computer 260 over a network 250. In FIG. 2, the device 202 obtains sensor data 228 from one or more sensors 238 on the device 202. The sensor data 228 may include at least one of image data or audio data. The device 202 (e.g., the microcontroller 106 of FIG. 1) may execute an inference operation 224-1 by invoking a ML model 226 to perform image and/or audio processing on the sensor data 228 to detect whether the sensor data 228 includes a type of data in which the ML model 226 is trained. In some examples, the device 202 may include multiple classifiers (e.g., multiple microcontrollers 106), where each classifier may render a decision to send the sensor data 228 (or the results of the decision) to another classifier, which may be on the device 202 or another device such as the computing device 252.

If the type of data in which the ML model 226 is trained is detected, the device 202 may transmit the sensor data 228 to the computing device 252 over the wireless connection 248. Then, the computing device 252 may transmit the sensor data 228, over the network 250, to the server computer 260. In some examples, the computing device 252 may include one or more classifiers that process audio/image data captured by the sensor(s) 238 to render decision(s) on whether to invoke another classifier on the computing device 252, the device 202, or the server computer 260. The server computer 260 includes one or more processors 262, which may be formed in a substrate configured to execute one or more machine executable instructions or pieces of software, firmware, or a combination thereof. The processor(s) 262 can be semiconductor-based—that is, the processors can include semiconductor material that can perform digital logic. The server computer 260 includes one or more memory devices 264. The memory devices 264 may include a main memory that stores information in a format that can be read and/or executed by the processors 262.

The server computer 260 is configured to execute an inference operation 224-2 using the sensor data 228 and a ML model 229 stored on the server computer 260. The inference operation 224-1 and the inference operation 224-2 relate to different audio and/or image processing operations. In some examples, the inference operation 224-1 and the inference operation 224-2 relate to different audio processing operations. In some examples, the inference operation 224-1 and the inference operation 224-2 relate to different image recognition operations. In some examples, the inference operation 224-1 and the inference operation 224-2 relate to different perception operations.

The ML model 226 may have a size less than (e.g., substantially less than) a size of the ML model 229. The ML model 226 may define a number of parameters 211 that are required for the ML model 226 to make a prediction. The ML model 229 may define a number of parameters 215 that are required for the ML model 229 to make a prediction. The number of parameters 211 is less than (e.g., substantially less than) the number of parameters 215. In some examples, the number of parameters 215 is at least one thousand times greater than the number of parameters 211. In some examples, the number of parameters 215 is at least one million times greater than the number of parameters 211. In some examples, the number of parameters 211 is in a range between 10k and 100k. In some examples, the number of parameters 211 is less than 10k. In some examples, the number of parameters 215 is in a range between 10M and 100M. In some examples, the number of parameters 215 is greater than 100M.

Figure 3:
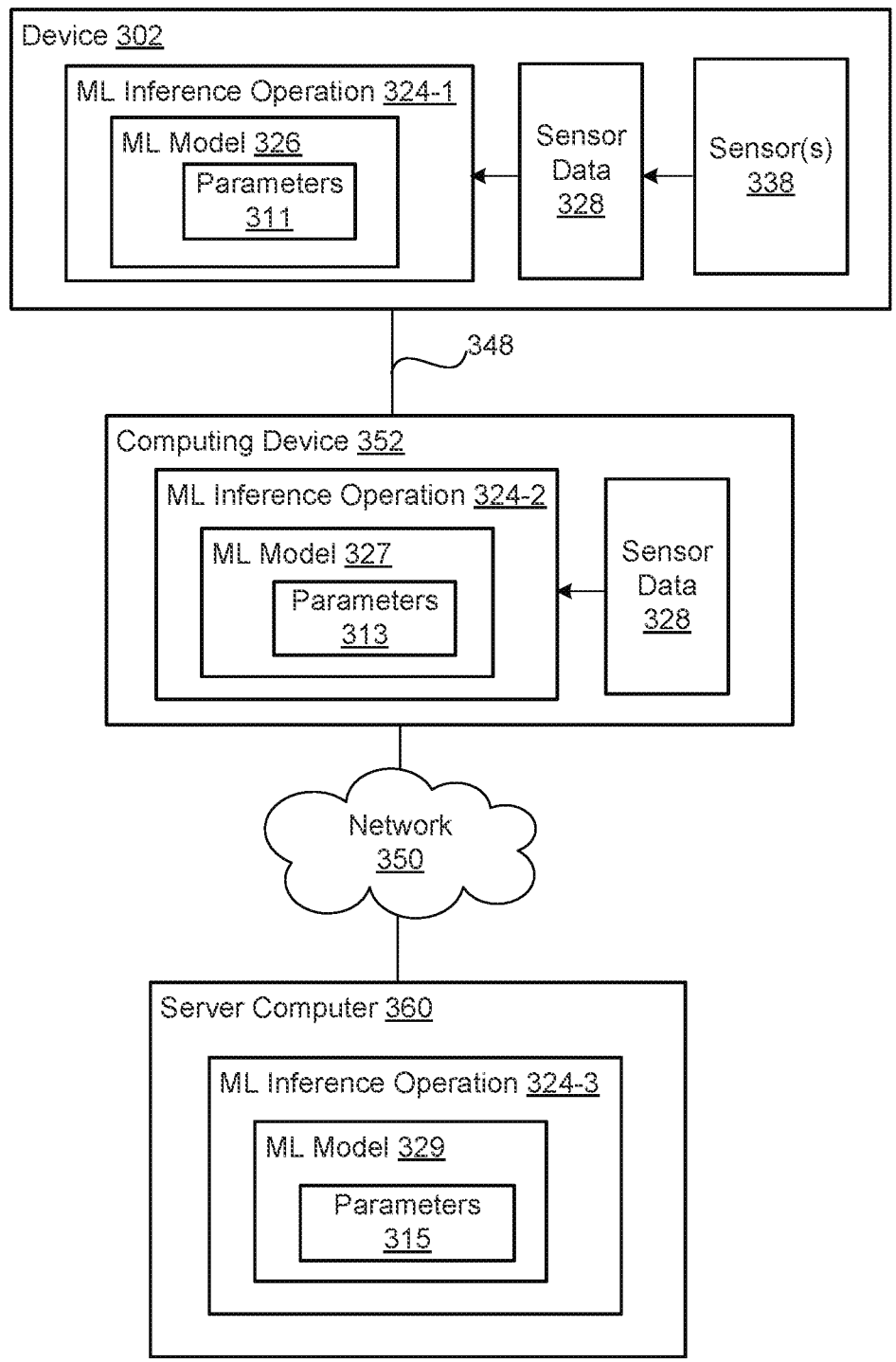
FIG. 3 illustrates a system for distributing image and/or audio processing across a wearable device, a computing device, and a server computer according to an aspect.

FIG. 3 illustrates a system 300 for distributing image and/or audio processing across multiple devices including a device 302, a computing device 352, and a server computer 360. The system 300 may be an example of the system 100 of FIG. 1 and/or the system 200 of FIG. 2 and may include any of the details disclosed with reference to those figures. The device 302 is connected to the computing device 352 over a wireless connection 348. In some examples, the device 302 is a head-mounted display device such as smartglasses. However, the device 302 may be other types of low-power devices as discussed herein. The computing device 352 is connected to the server computer 360 over a network 350. In FIG. 3, the device 302 obtains sensor data 328 from one or more sensors 338 on the device 302. The sensor data 328 may include at least one of image data or audio data. The device 302 (e.g., the microcontroller 106 of FIG. 1) may execute an inference operation 324-1 by invoking a ML model 326 to perform image and/or audio processing on the sensor data 328 to detect whether the sensor data 328 includes a type of data in which the ML model 326 is trained.

If the type of data in which the ML model 326 is trained is detected, the device 302 may transmit the sensor data 328 to the computing device 352 over the wireless connection 348. The computing device 352 is configured to execute an inference operation 324-2 using the sensor data 328 and a ML model 327 stored on the computing device 352. Then, the computing device 352 may transmit the results of the inference operation 324-2 and/or the sensor data 328, over the network 350, to the server computer 360.

The server computer 360 is configured to execute an inference operation 324-3 using the results of the inference operation 324-2 and/or the sensor data 328 and a ML model 329 stored on the server computer 360. The inference operation 324-1, the inference operation 324-2, and the inference operation 324-3 relate to different audio and/or image processing operations. In some examples, the inference operation 324-1, the inference operation 324-2, the inference operation 324-3 relate to different audio processing operations. In some examples, the inference operation 324-1, the inference operation 324-2, the inference operation 324-3 relate to different image recognition operations. In some examples, the inference operation 324-1, the inference operation 324-2, and the inference operation 324-3 relate to different perception operations.

The ML model 326 may have a size less than (e.g., substantially less than) a size of the ML model 327. The ML model 327 may have a size less than (e.g., substantially less than) a size of the ML model 329. The ML model 326 may define a number of parameters 311 that are required for the ML model 326 to make a prediction. The ML model 327 may define a number of parameters 313 that are required for the ML model 327 to make a prediction. The ML model 329 may define a number of parameters 315 that are required for the ML model 329 to make a prediction. The number of parameters 311 is less than (e.g., substantially less than) the number of parameters 313. The number of parameters 313 is less than (e.g., substantially less than) the number of parameters 315. In some examples, the number of parameters 311 is in a range between 10k and 100k. In some examples, the number of parameters 311 is less than 10k. In some examples, the number of parameters 313 is in a range between 100K and 1M. In some examples, the number of parameters 313 is greater than 1M. In some examples, the number of parameters 315 is in a range between 10M and 100M. In some examples, the number of parameters 315 is greater than 100M.

Figure 4:
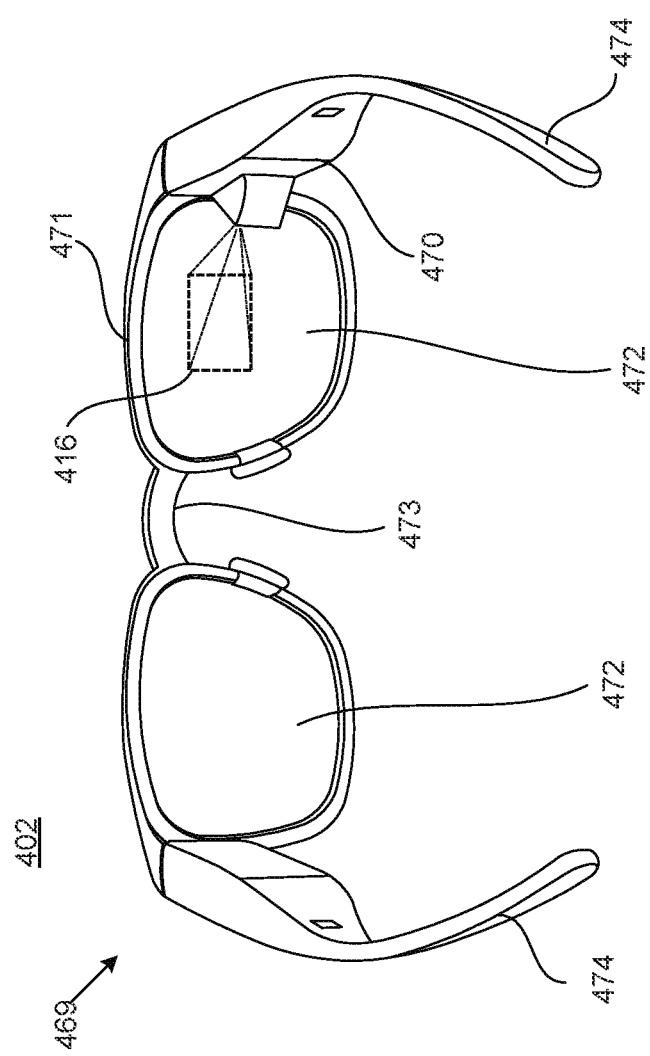
FIG. 4 illustrates an example of a head-mounted display device according to an aspect.

FIG. 4 illustrates an example of a head-mounted display device 402 according to an aspect. The head-mounted display device 402 may be an example of the device 102 of FIG. 1, the device 202 of FIG. 2, and/or the device 302 of FIG. 3. The head-mounted display device 402 includes smartglasses 469. Smartglasses 469 are glasses that add information (e.g., project a display 416) alongside what the wearer views through the glasses. In some examples, instead of projecting information, the display 416 is an in-lens micro display. Smartglasses 469 (e.g., eyeglasses or spectacles), are vision aids, including lenses 472 (e.g., glass or hard plastic lenses) mounted in a frame 471 that holds them in front of a person's eyes, typically utilizing a bridge 473 over the nose, and legs 474 (e.g., temples or temple pieces) which rest over the ears. The smartglasses 469 include an electronics component 470 that includes circuitry of the smartglasses 469. In some examples, the electronics component 470 includes a housing that encloses the components of the device 102 of FIG. 1, the device 202 of FIG. 2, and/or the device 302 of FIG. 3. In some examples, the electronics component 470 is included or integrated into one (or both) of the legs 474 of the smartglasses 469.

Figure 5:
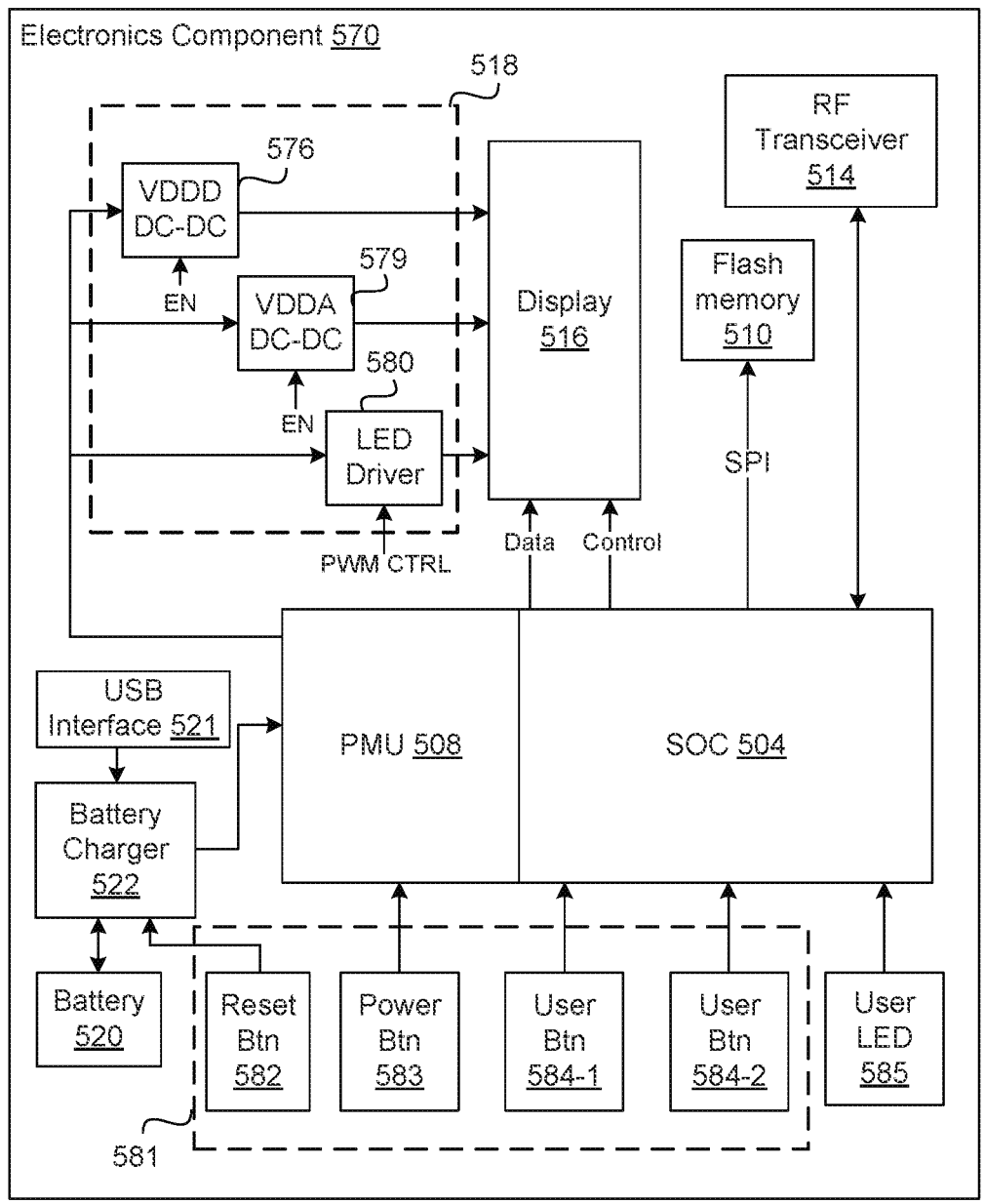
FIG. 5 illustrates an example of an electronics component on a head-mounted display device according to an aspect.

FIG. 5 illustrates an example of an electronics component 570 of a pair of smartglasses according to an example. The electronics component 570 may be an example of the electronics component 470 of FIG. 4. The smartglasses' electronics component 570 may include display regulators 518, a display 516, a flash memory 510, an RF transceiver 514, a universal serial bus (USB) interface 521, a power management unit (PMU) 508, a system on chip (SOC) 504, a battery charger 522, a battery 520, a plurality of user controls 581, and a user light emitting diode (LED) 585. The display regulators 518, the display 516, the RF transceiver 514, the battery charger 522, and the battery 520 may be an example of the display regulators 118, the display 116, the RF transceiver 114, the battery charger 122, and the battery 120 of FIG. 1. The SOC 504 may include the processor(s) 104 (including the microcontroller 106) of FIG. 1. The flash memory 510 may be an example of the memory device 110 of FIG. 1. The flash memory 510 may store the weights for any ML models executable by the SOC 504.

The SOC 504 may provide the data and control information to the display 516 that is projected in the field of view of the user. In some examples, the PMU 508 is included within or integrated with the SOC 504. The display regulators 518 are connected to the PMU 508. The display regulators 518 may include a first converter 576 (e.g., a VDDD DC-DC converter), a second converter 579 (e.g., a VDDA DC-DC converter), and a LED driver 580. The first converter 576 is configured to activate in response to an enable signal, and the second converter 579 is configured to activate in response to an enable signal. The LED driver 580 is configured to be driven according to a pulse width modulation (PWM) control signal. The plurality of user controls 581 may include a reset button 582, a power button 583, a first user button 584-1, and a second user button 584-2.

Figure 6:
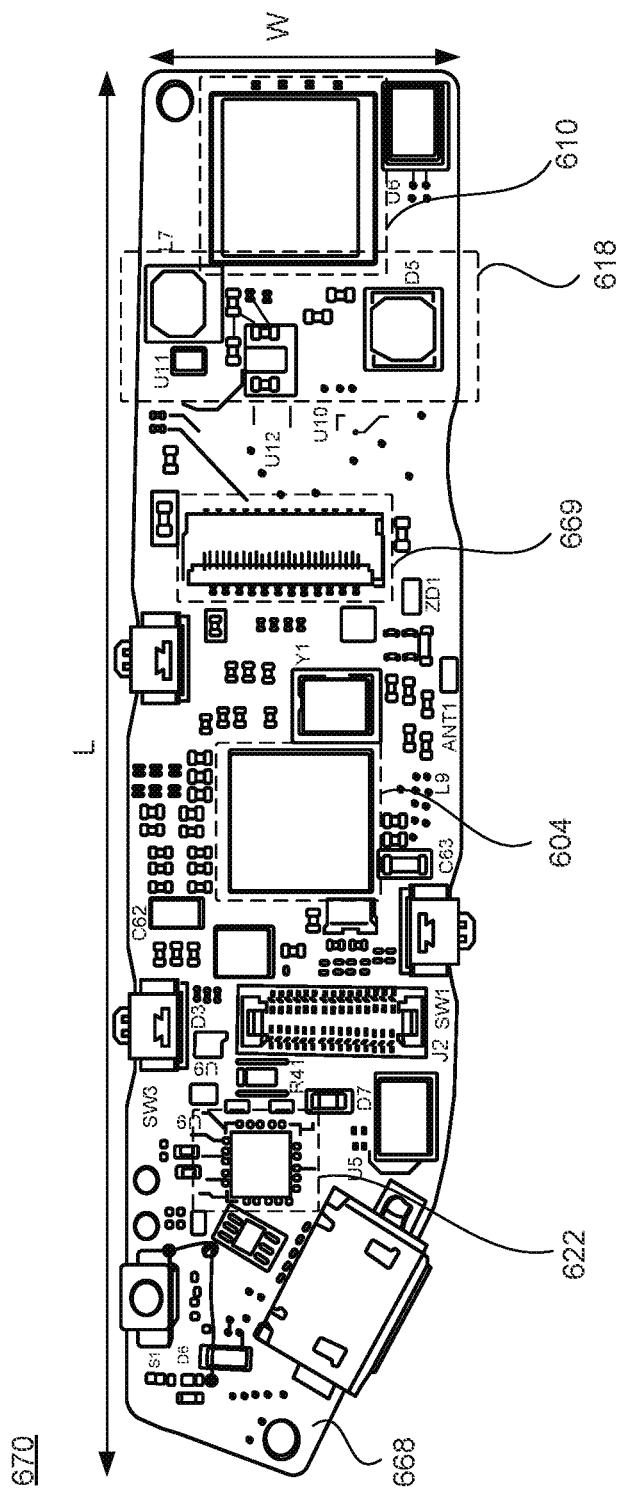
FIG. 6 illustrates a printed circuit board substrate of an electronics component on a head-mounted display device according to an aspect.

FIG. 6 illustrates a printed circuit board (PCB) substrate 668 for smartglasses according to an aspect. The PCB substrate 668 may be an example of and/or included within the electronics component 470 of FIG. 4 and/or the electronics component 570 of FIG. 5. The PCB substrate 668 includes a plurality of circuit components. In some examples, the circuit components are coupled on one side of the PCB substrate 668. In some examples, the circuit components are coupled on both sides of the PCB substrate 668. The PCB substrate 668 may include a battery charger 622, an SOC 604, a display flex 669, display regulators 618, and a flash memory 610. The PCB substrate 668 may be relatively compact. For example, the PCB substrate 668 may define a length (L) and a width (W). In some examples, the length (L) is in a range of 40 mm to 80 mm. In some examples, the length (L) is in a range of 50 mm to 70 mm. In some examples, the length (L) is 60 mm. In some examples, the width (W) is in a range of 8 mm to 25 mm. In some examples, the width (W) is in a range of 10 mm to 20 mm. In some examples, the width (W) is 14.5 mm.

Figure 7A:
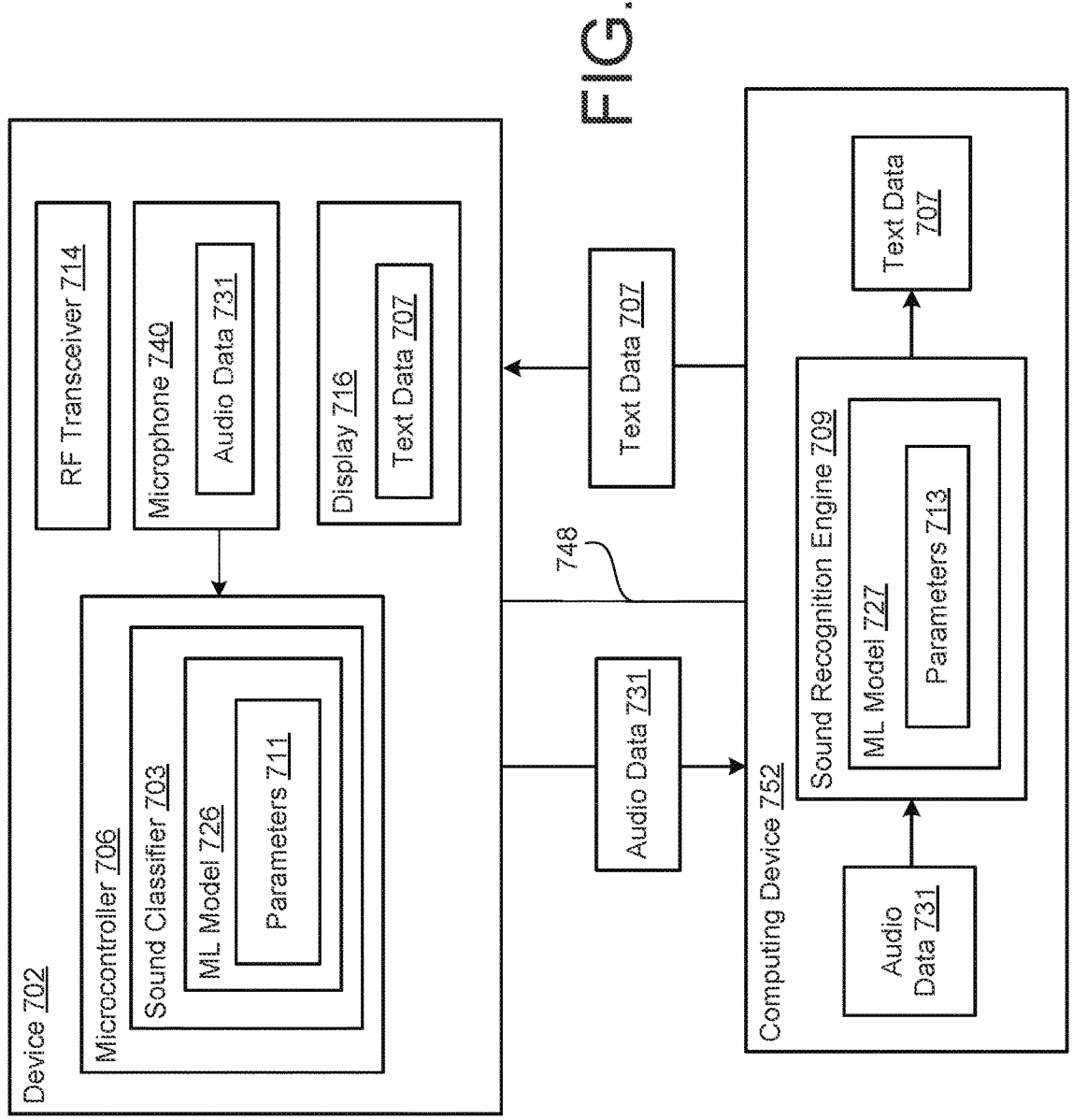
FIG. 7A illustrates a system for distributing audio processing between a wearable device and a computing device according to an aspect.
Figure 7B:
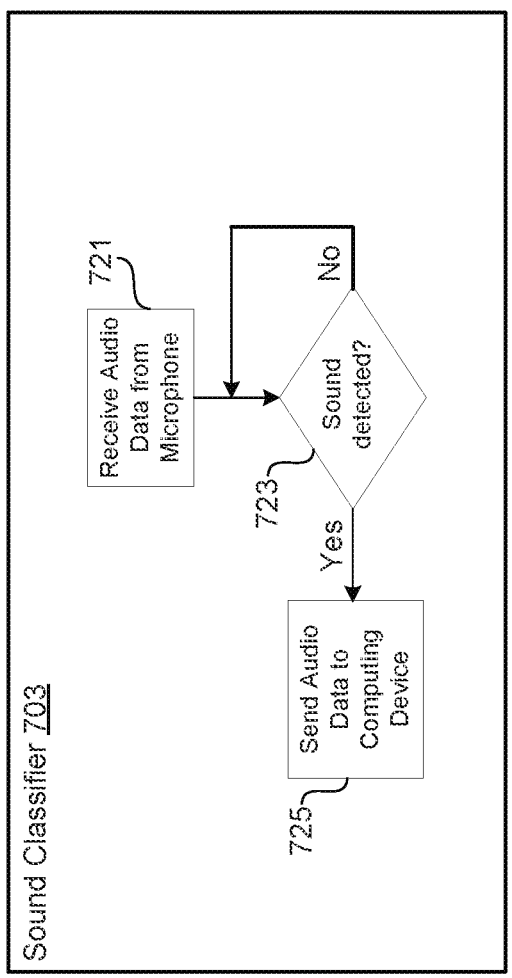
FIG. 7B illustrates a sound classifier according to an aspect.

FIGS. 7A and 7B illustrate a system 700 for distributing sound recognition operations between a device 702 and a computing device 752. The system 700 may be an example of the system 100 of FIG. 1, the system 200 of FIG. 2, and/or the system 300 of FIG. 3 and may include any of the details discussed with reference to those figures. In some examples, the device 702 may be an example of the head-mounted display device 402 of FIG. 4 and may include any of the details discussed with reference to that figure. In some examples, the components of the device 702 may include the electronics component 570 of FIG. 5 and/or the electronics component 670 of FIG. 6.

As shown in FIG. 7A, sound recognition operations are distributed between the device 702 and the computing device 752. The device 702 is connected to the computing device 752 via a wireless connection 748 such as a short-term wireless connection such as Bluetooth or NFC connection. In some examples, the wireless connection 748 is a Bluetooth connection. In some examples, the device 702 includes a sound recognition application that enables audio data 731 to be captured by a microphone 740 on the device 702 and text data 707 to be displayed on a display 716 of the device 702.

The device 702 includes a microcontroller 706 that executes a sound classifier 703 to detect whether or not a sound of interest (e.g., speech, alarm, etc.) is included within audio data 731 captured by a microphone 740 on the device 702. The sound classifier 703 may include or be defined by a ML model 726. The ML model 726 may define a number of parameters 711 that are required for the ML model 726 to make a prediction (e.g., whether or not the sound of interest is included within the audio data 731). The ML model 726 may be relatively small since the actual conversion is offloaded to the computing device 752. For example, the number of parameters 711 may be in a range between 10k and 100k. The sound classifier 703 may save power and latency through its relatively small ML model 726.

Referring to FIG. 7B, in operation 721, the sound classifier 703 may receive audio data 731 from the microphone 740 on the device 702. In operation 723, the sound classifier 703 may determine whether or not the sound of interest is detected in the audio data 731. If the sound of interest is not detected (No), the sound classifier 703 continues to monitor the audio data 731, received via the microphone 740, to determine whether or not the sound of interest is detected. If the sound of interest is detected (Yes), in operation 725, the device 702 streams the audio data 731 to the computing device 752 over the wireless connection 748. For example, an RF transceiver 714 on the device 702 may transmit the audio data 731 over the wireless connection 748. In some examples, the device 702 compresses the audio data 731, and then transmits the compressed audio data 731 to the computing device 752.

Referring to FIG. 7A, the computing device 752 includes a sound recognition engine 709 (e.g., another classifier) that executes a ML model 727 (e.g., a larger ML model) to convert the sound of the audio data 731 to text data 707. The ML model 727 may define a number of parameters 713 that are required for the ML model 727 to make a prediction. In some examples, the number of parameters 713 is at least ten times greater than the number of parameters 711. In some examples, the number of parameters 713 is at least one hundred times greater than the number of parameters 711. In some examples, the number of parameters 713 is at least one thousand times greater than the number of parameters 711. In some examples, the number of parameters 713 is at least one million times greater than the number of parameters 711. In some examples, the number of parameters 713 is in a range between 1M and 10M. In some examples, the number of parameters 713 is greater than 10M. The computing device 752 transmits the text data 707 to the device 702 via the wireless connection 748. The device 702 displays the text data 707 on the device's display 716.

Figure 8:
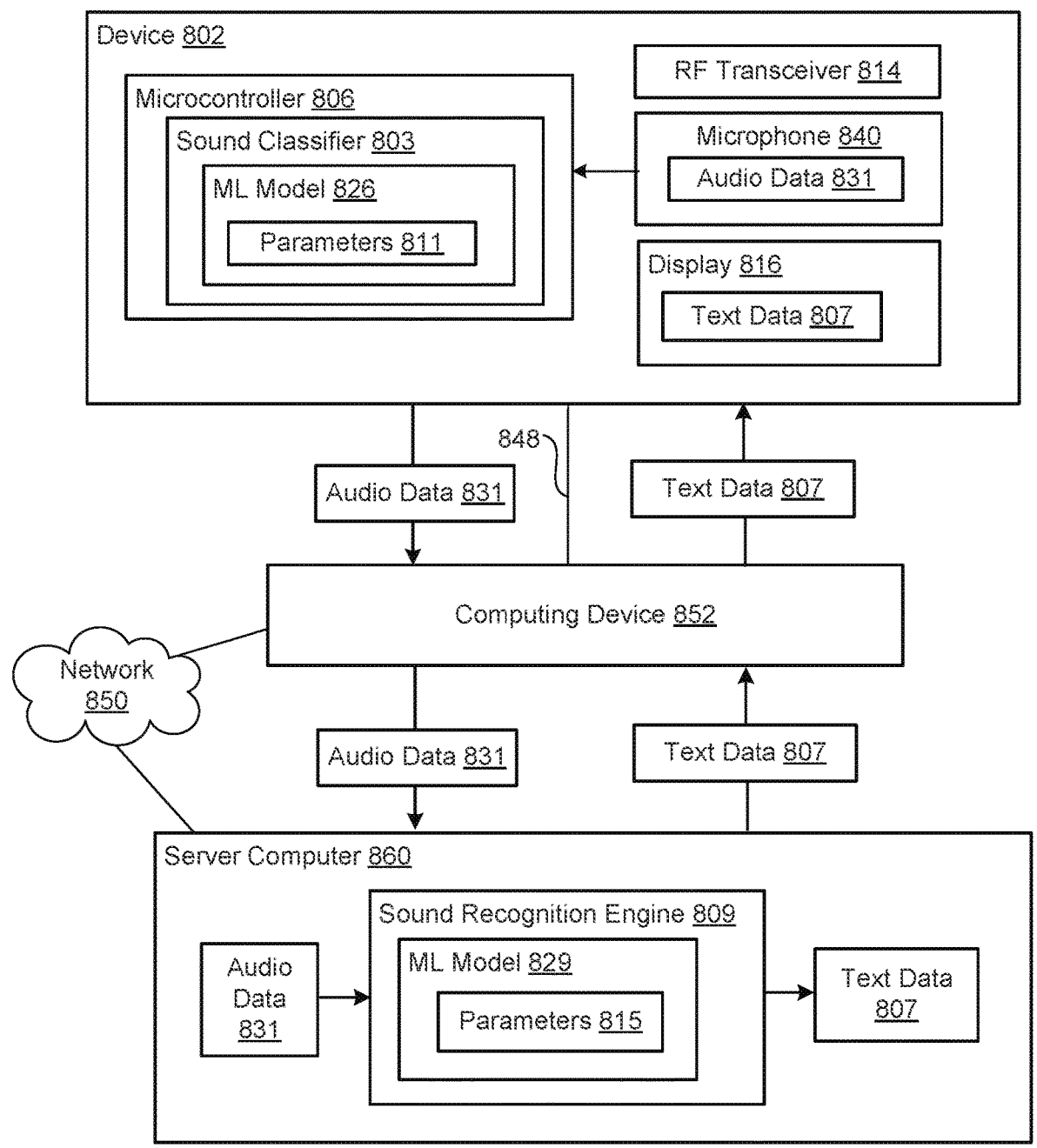
FIG. 8 illustrates a system for distributing audio processing between a wearable device and a server computer according to an aspect.

FIG. 8 illustrates a system 800 for distributing sound recognition operations between a device 802 and a server computer 860. The system 800 may be an example of the system 100 of FIG. 1, the system 200 of FIG. 2, the system 300 of FIG. 3, and/or the system 700 of FIGS. 7A and 7B and may include any of the details discussed with reference to those figures. In some examples, the device 802 may be an example of the head-mounted display device 402 of FIG. 4 and may include any of the details discussed with reference to that figure. In some examples, the components of the device 802 may include the electronics component 570 of FIG. 5 and/or the electronics component 670 of FIG. 6.

As shown in FIG. 8, sound recognition operations are distributed between the device 802 and the server computer 860, where audio data 831 can be provided to the server computer 860 via a computing device 852. The device 802 is connected to the computing device 852 via a wireless connection 848 such as a short-term wireless connection such as Bluetooth or NFC connection. In some examples, the wireless connection 848 is a Bluetooth connection. The computing device 852 is connected to the server computer 860 over a network 850 (e.g., the Internet such as Wi-Fi or mobile connection). In some examples, the device 802 includes a sound recognition application that enables audio data 831 to be captured by a microphone 840 on the device 802 and text data 807 to be displayed on a display 816 of the device 802.

The device 802 includes a microcontroller 806 that executes a sound classifier 803 to detect whether or not a sound of interest is included within audio data 831 captured by a microphone 840 on the device 802. The sound classifier 803 may include or be defined by a ML model 826. The ML model 826 may define a number of parameters 811 that are required for the ML model 826 to make a prediction (e.g., whether or not the sound of interest is included within the audio data 831). The ML model 826 may be relatively small since the actual conversion is offloaded to the server computer 860. For example, the number of parameters 811 may be in a range between 10k and 100k. The sound classifier 803 may save power and latency through its relatively small ML model 826.

If the sound of interest is not detected, the sound classifier 803 continues to monitor the audio data 831, received via the microphone 840, to determine whether or not sound of interest is detected. If the sound of interest is detected, the device 802 streams the audio data 831 to the computing device 852 over the wireless connection 848. For example, an RF transceiver 814 on the device 802 may transmit the audio data 831 over the wireless connection 848. In some examples, the device 802 compresses the audio data 831, and then transmits the compressed audio data 831 to the computing device 852.

In some examples, the computing device 852 may transmit the audio data 831 to the server computer 860 over the network 850. In some examples, the computing device 852 determines whether or not the computing device 852 has the capabilities of converting the sound to text data 807. If not, the computing device 852 may transmit the audio data 831 to the server computer 860. If so, the computing device 852 may perform the sound conversion, as discussed with reference to the system 700 of FIGS. 7A and 7B.

In some examples, the computing device 852 determines whether the sound conversion includes the translation into another language. For example, the audio data 831 may include speech in the English language, but the parameters of the sound recognition application indicate to provide the text data 807 in another language such as German. In some examples, if the conversation includes the translation into another language, the computing device 852 may transmit the audio data 831 to the server computer 860. In some examples, upon receipt of audio data 831 from the device 802, the computing device 852 may automatically transmit the audio data 831 to the server computer 860. In some examples, the device 802 transmit the audio data 831 directly to the server computer 860 via the network 850 (e.g., without using the computing device 852) and the device 802 receives the text data 807 from the server computer 860 via the network 850 (e.g., without using the computing device 852).

The server computer 860 includes a sound recognition engine 809 that executes a ML model 829 (e.g., a larger ML model) to convert the sound of the audio data 831 to text data 807. In some examples, the conversion of speech to text data 807 includes the translation into a different language. The ML model 829 may define a number of parameters 815 that are required for the ML model 829 to make a prediction (e.g., the conversation of sound to text data 807). In some examples, the number of parameters 815 is at least one thousand times greater than the number of parameters 811. In some examples, the number of parameters 815 is at least one million times greater than the number of parameters 811. In some examples, the number of parameters 815 is at least one hundred million times greater than the number of parameters 811. In some examples, the number of parameters 815 is in a range between 1M and 100M. In some examples, the number of parameters 815 is greater than 100M. The server computer 860 transmits the text data 807 to the computing device 852 over the network 850. The computing device 852 transmits the text data 807 to the device 802 via the wireless connection 848. The device 802 displays the text data 807 on the device's display 816.

Figure 9:
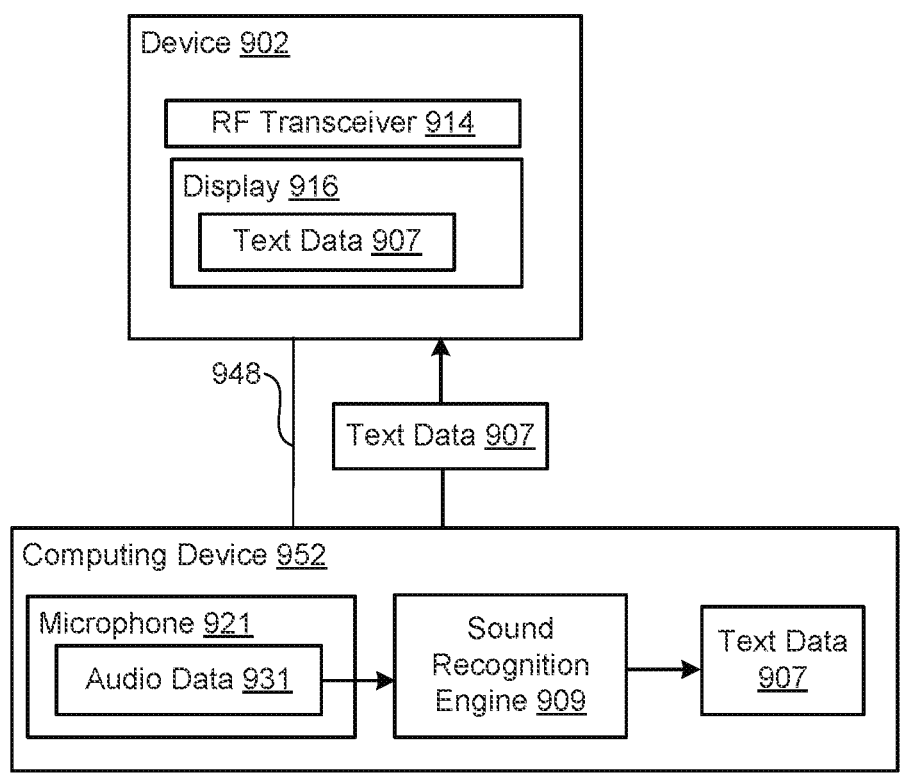
FIG. 9 illustrates a system for audio processing using a wearable device and a computing device according to an aspect.

FIG. 9 illustrates a system 900 for sound recognition operations using a device 902. The system 900 may be an example of the system 100 of FIG. 1, the system 200 of FIG. 2, the system 300 of FIG. 3, the system 700 of FIGS. 7A and 7B, and/or the system 800 of FIG. 8 and may include any of the details discussed with reference to those figures. In some examples, the device 902 may be an example of the head-mounted display device 402 of FIG. 4 and may include any of the details discussed with reference to that figure. In some examples, the components of the device 902 may include the electronics component 570 of FIG. 5 and/or the electronics component 670 of FIG. 6.

The device 902 is connected to the computing device 952 via a wireless connection 948 such as a short-term wireless connection such as Bluetooth or NFC connection. In some examples, the wireless connection 948 is a Bluetooth connection. The computing device 952 may include a microphone 921 configured to capture audio data 931, and a sound recognition engine 909 configured to convert sound of the audio data 931 to text data 907. The sound recognition engine 909 may include or be defined by a ML model, as discussed with reference to the previous figures. After the conversion of sound to text data 907, the computing device 952 may transmit the text data 907 to the device 902 via the wireless connection 948, and the device 902 receives the text data 907 via an RF transceiver 914 on the device 902. The device 902 is configured to display the text data 907 on a display 916 of the device 902.

Figure 10:
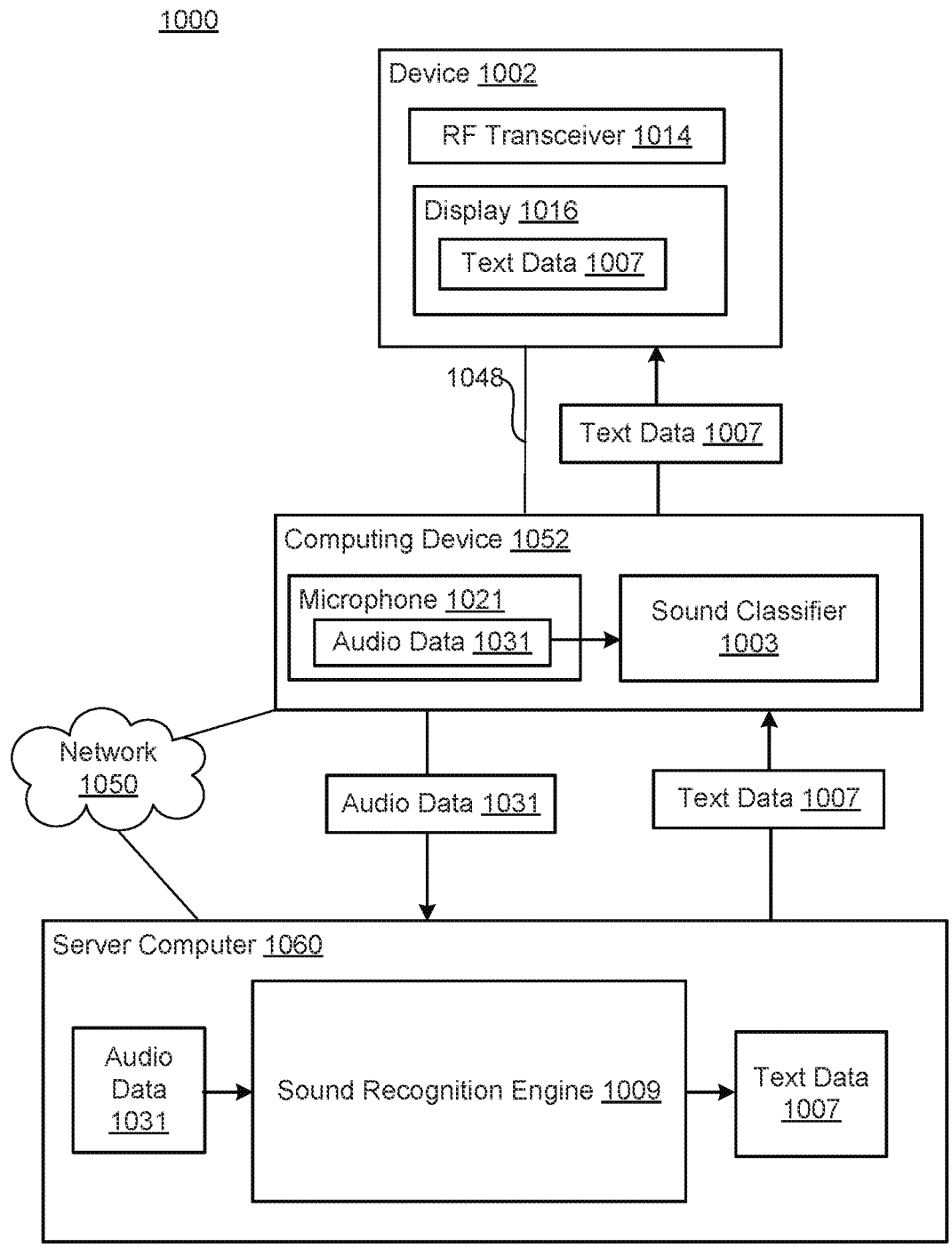
FIG. 10 illustrates a system for audio processing using a wearable device, a computing device, and a server computer according to an aspect.

FIG. 10 illustrates a system 1000 for executing sound recognition operations using a device 1002. The system 1000 may be an example of the system 100 of FIG. 1, the system 200 of FIG. 2, the system 300 of FIG. 3, the system 700 of FIGS. 7A and 7B, the system 800 of FIG. 8, and/or the system 900 of FIG. 9 and may include any of the details discussed with reference to those figures. In some examples, the device 1002 may be an example of the head-mounted display device 402 of FIG. 4 and may include any of the details discussed with reference to that figure. In some examples, the components of the device 1002 may include the electronics component 570 of FIG. 5 and/or the electronics component 670 of FIG. 6.

As shown in FIG. 10, sound recognition operations are distributed between the computing device 1052 and the server computer 1060, where text data 1007 is displayed via the device 1002. The device 1002 is connected to the computing device 1052 via a wireless connection 1048 such as a short-term wireless connection such as Bluetooth or NFC connection. In some examples, the wireless connection 1048 is a Bluetooth connection. The computing device 1052 is connected to the server computer 1060 over a network 1050 (e.g., the Internet such as Wi-Fi or mobile connection).

The computing device 1052 includes a microphone 1021 configured to capture audio data 1031. Also, the computing device 1052 includes a sound classifier 1003 (e.g., a ML model) to detect whether or not the sound of interest is included within audio data 1031 captured by the microphone 1021 on the computing device 1052. If the sound of interest is not detected, the sound classifier 1003 continues to monitor the audio data 1031, received via the microphone 1021, to determine whether or not the sound of interest is detected. If sound of interest is detected, the computing device 1052 streams the audio data 1031 to the server computer 1060 over the network 1050. In some examples, the computing device 1052 determines whether or not the computing device 1052 has the capabilities of converting the sound to text data 1007. If not, the computing device 1052 may transmit the audio data 1031 to the server computer 1060. If so, the computing device 1052 may perform the sound conversion, as discussed with reference to the system 900 of FIG. 9. In some examples, the computing device 1052 compresses the audio data 1031, and sends the compressed audio data 1031 to the server computer 1060.

In some examples, the computing device 1052 determines whether the sound conversion includes the translation into another language. For example, the audio data 1031 may include speech in the English language, but the parameters of the speech-to-text application indicate to provide the text data 1007 in a different language. In some examples, if the speech-to-text conversation includes the translation into another language, the computing device 1052 may transmit the audio data 1031 to the server computer 1060. In some examples, upon the detection of speech within the audio data 1031, the computing device 1052 may automatically transmit the audio data 1031 to the server computer 1060.

The server computer 1060 includes a sound recognition engine 1009 that executes a ML model to convert the sound of the audio data 1031 to text data 1007. In some examples, the conversion of sound to text data 1007 includes the translation into a different language. The server computer 1060 transmits the text data 1007 to the computing device 1052 over the network 1050. The computing device 1052 transmits the text data 1007 to an RF transceiver 1014 on the device 1002 via the wireless connection 1048. The device 1002 displays the text data 1007 on the device's display 1016.

Figure 11:
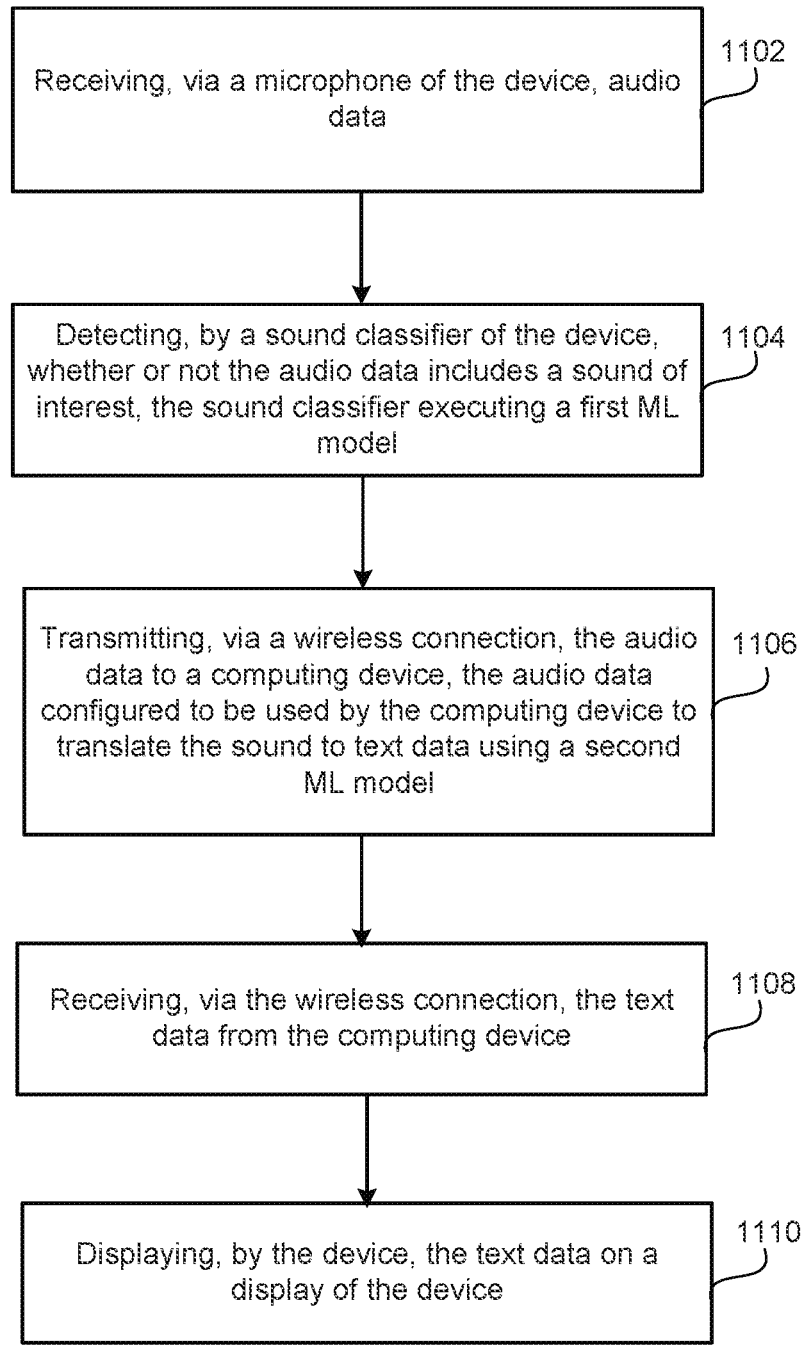
FIG. 11 illustrates a flowchart for audio processing using a wearable device according to an aspect.

FIG. 11 is a flowchart 1100 depicting example operations of the system 700 of FIGS. 7A and 7B. Although the flowchart 1100 of FIG. 11 is explained with respect to the system 700 of FIGS. 7A and 7B, the flowchart 1100 may be applicable to any of the embodiments discussed herein including the system 100 of FIG. 1, the system 200 of FIG. 2, the system 300 of FIG. 3, the head-mounted display device 402 of FIG. 4, the electronics component 570 of FIG. 5, the electronics component 670 of FIG. 6, the system 800 of FIG. 8, the system 900 of FIG. 9, and/or the system 1000 of FIG. 10. Although the flowchart 1100 of FIG. 11 illustrates the operations in sequential order, it will be appreciated that this is merely an example, and that additional or alternative operations may be included. Further, operations of FIG. 11 and related operations may be executed in a different order than that shown, or in a parallel or overlapping fashion.

Operation 1102 includes receiving, via a microphone 740 of the device 702, audio data 731. Operation 1104 includes detecting, by a sound classifier 703, whether or not the audio data 731 includes a sound of interest (e.g., speech), where the sound classifier 703 executes a first ML model (e.g., ML model 726).

Operation 1106 includes transmitting, via a wireless connection 748, the audio data 731 to a computing device 752, where the audio data 731 is configured to be used by the computing device 752 to translate the sound of interest to text data 707 using a second ML model (e.g., ML model 727). Operation 1108 includes receiving, via the wireless connection 748, the text data 707 from the computing device 752. Operation 1110 includes displaying, by the device 702, the text data 707 on a display 716 of the device 702.

Figure 12:
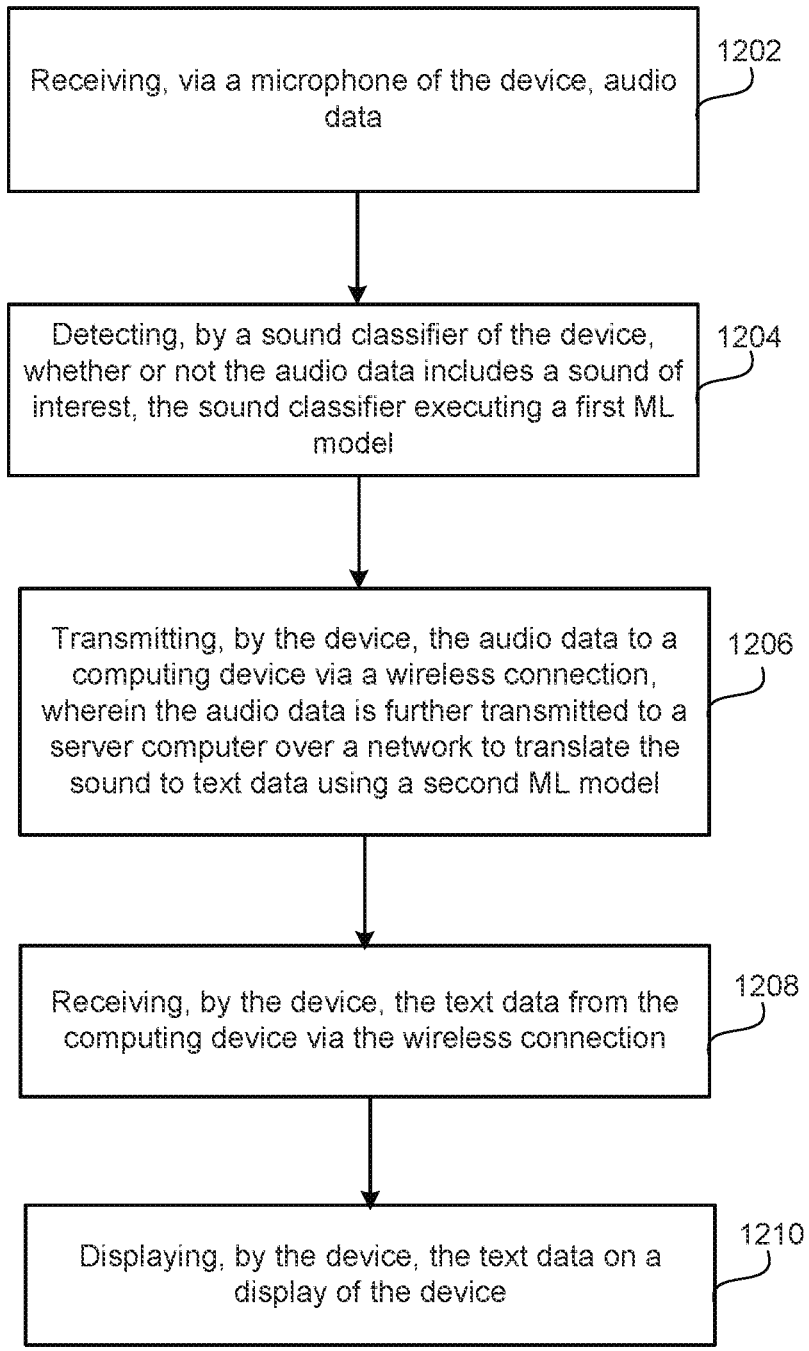
FIG. 12 illustrates a flowchart for audio processing using a wearable device according to another aspect.

FIG. 12 is a flowchart 1200 depicting example operations of the system 800 of FIG. 8. Although the flowchart 1200 of FIG. 12 is explained with respect to the system 800 of FIG. 8, the flowchart 1200 may be applicable to any of the embodiments discussed herein including the system 100 of FIG. 1, the system 200 of FIG. 2, the system 300 of FIG. 3, the head-mounted display device 402 of FIG. 4, the electronics component 570 of FIG. 5, the electronics component 670 of FIG. 6, the system 700 of FIGS. 7A and 7B, the system 900 of FIG. 9, and/or the system 1000 of FIG. 10. Although the flowchart 1200 of FIG. 12 illustrates the operations in sequential order, it will be appreciated that this is merely an example, and that additional or alternative operations may be included. Further, operations of FIG. 12 and related operations may be executed in a different order than that shown, or in a parallel or overlapping fashion.

Operation 1202 includes receiving, via a microphone 840 of the device 802, audio data 831. Operation 1204 includes detecting, by a sound classifier 803 of the device 802, whether or not the audio data 831 includes a sound of interest (e.g., speech), where the sound classifier 803 executes a first ML model (e.g., ML model 826).

Operation 1206 includes transmitting, by the device 802, the audio data 831 to a computing device 852 via a wireless connection 848, where the audio data 831 is further transmitted to a server computer 860 over a network 850 to translate the sound to text data 807 using a second ML model (e.g., ML model 829). Operation 1208 includes receiving, by the device 802, the text data 807 from the computing device 852 via the wireless connection 848. Operation 1210 includes displaying, by the device 802, the text data 807 on a display 816 of the device 802.

Figure 13A:
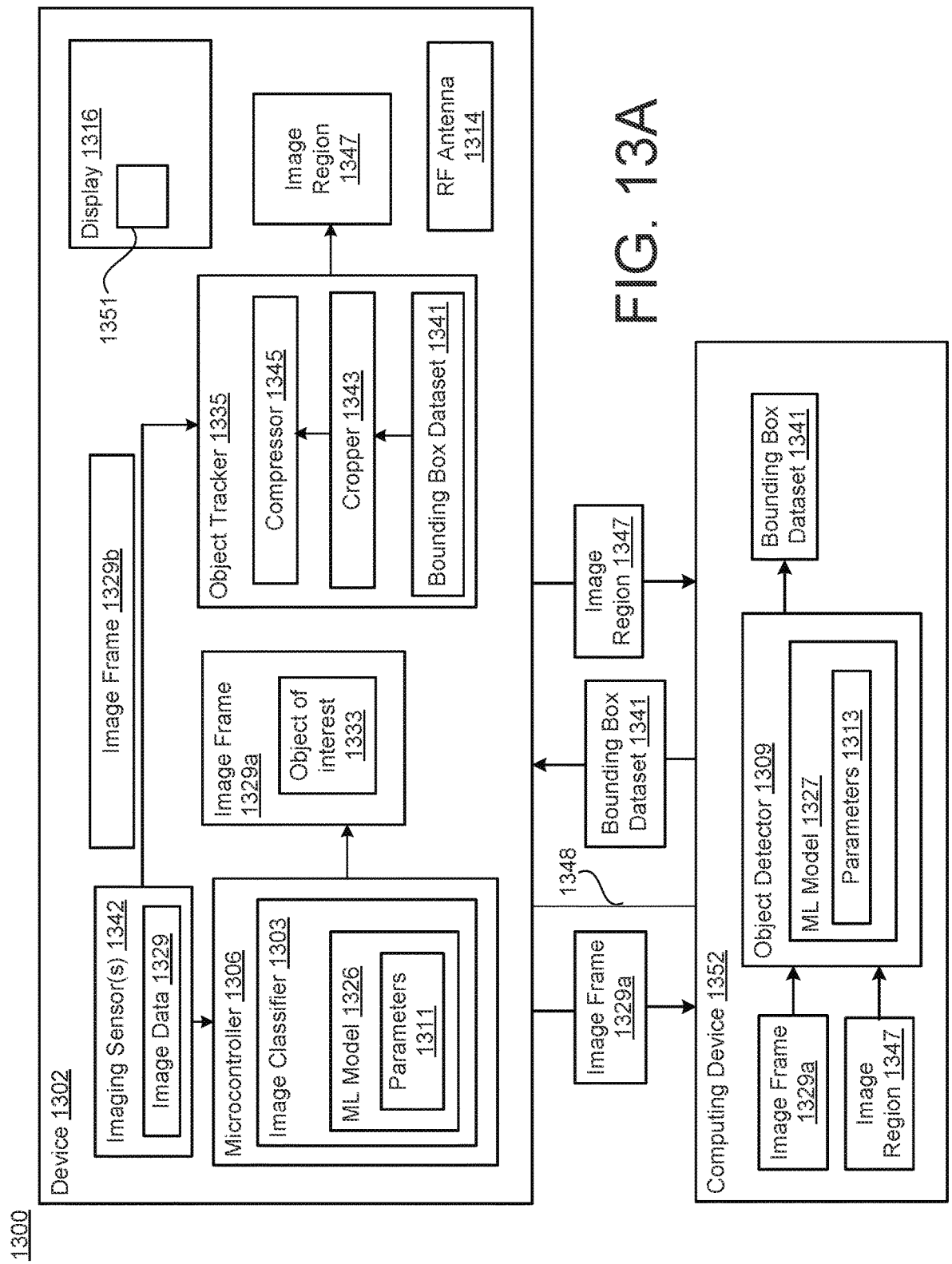
FIG. 13A illustrates a system for image processing using a wearable device and a computing device according to an aspect.
Figure 13B:
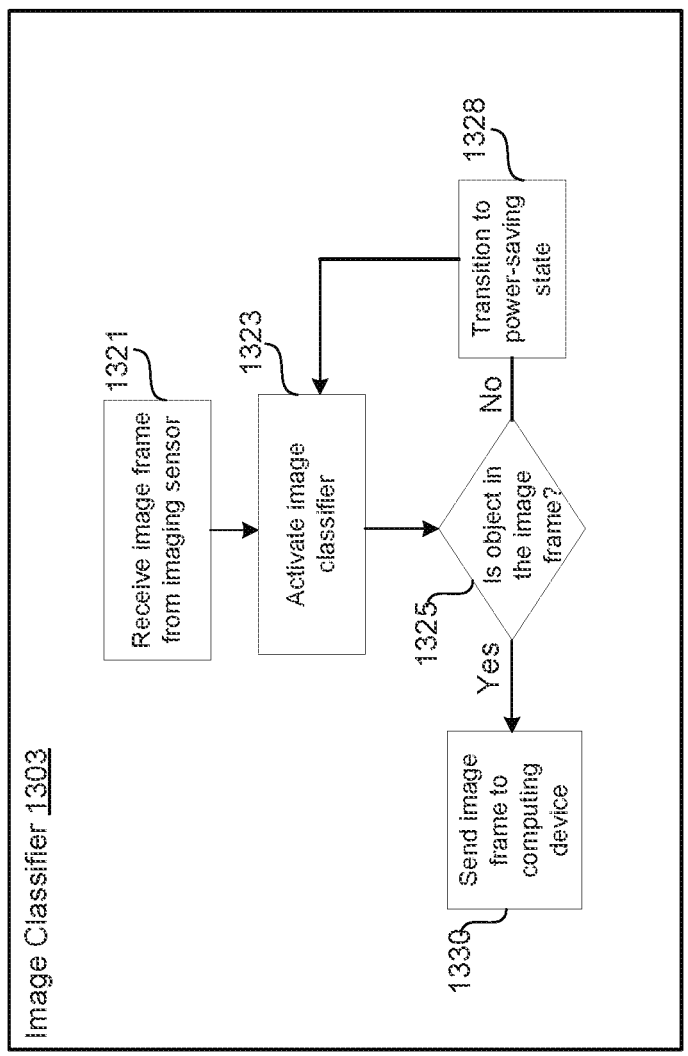
FIG. 13B illustrates an image classifier according to an aspect.
Figure 13C:
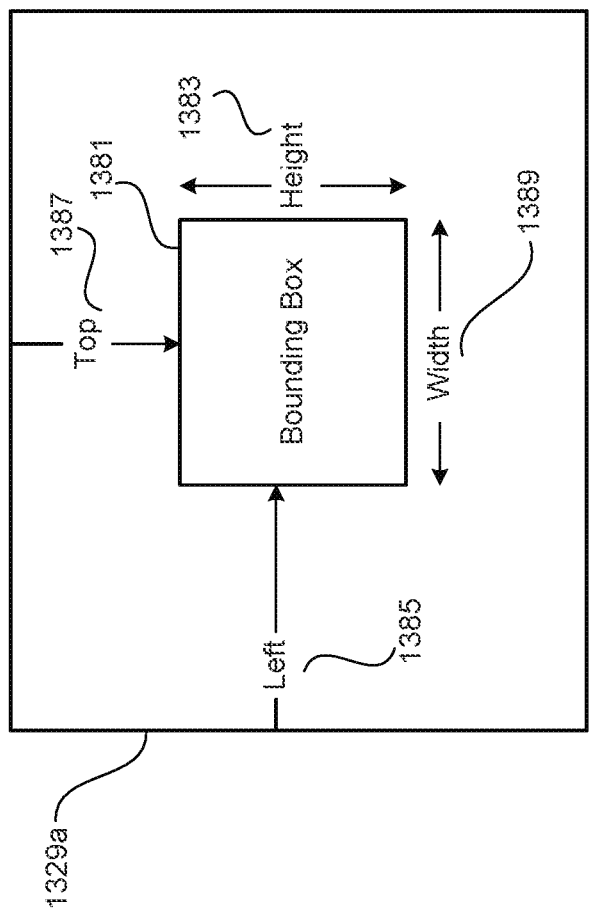
FIG. 13C illustrates an example of bounding box dataset according to an aspect.

FIGS. 13A through 13C illustrate a system 1300 for distributing image recognition operations between a device 1302 and a computing device 1352. The system 1300 may be an example of the system 100 of FIG. 1, the system 200 of FIG. 2, and/or the system 300 of FIG. 3 and may include any of the details discussed with reference to those figures.

In some examples, the device 1302 may be an example of the head-mounted display device 402 of FIG. 4 and may include any of the details discussed with reference to that figure. In some examples, the components of the device 1302 may include the electronics component 570 of FIG. 5 and/or the electronics component 670 of FIG. 6. In some examples, the system 1300 also includes the capabilities of distributed sound recognition operations and may include any of the details discussed with reference to the system 700 of FIGS. 7A and 7B, the system 800 of FIG. 8, the system 900 of FIG. 9, and/or the system 1000 of FIG. 10.

As shown in FIG. 13A, image recognition operations are distributed between the device 1302 and the computing device 1352. In some examples, the image recognition operations include facial detection and tracking. However, the image recognition operations may include operations to detect (and track) other regions of interest in image data such as objects, text, and barcodes. The device 1302 is connected to the computing device 1352 via a wireless connection 1348 such as a short-term wireless connection such as Bluetooth or NFC. In some examples, the wireless connection 1348 is a Bluetooth connection. In some examples, the device 1302 and/or the computing device 1352 include an image recognition application that enables objects to be recognized (and tracked) via image data captured by one or more imaging sensors 1342.

The device 1302 includes a microcontroller 1306 that executes an image classifier 1303 to detect whether or not an object of interest 1333 is included within image data 1329 captured by the imaging sensor(s) 1342 on the device 1302. In some examples, the object of interest 1333 includes facial features. In some examples, the object of interest 1333 includes text data. In some examples, the object of interest 1333 includes OCR code. However, the object of interest 1333 may be any type of object capable of being detected in image data. The image classifier 1303 may include or be defined by a ML model 1326. The ML model 1326 may define a number of parameters 1311 that are required for the ML model 1326 to make a prediction (e.g., whether or not the object of interest 1333 is included within the image data 1329). The ML model 1326 may be relatively small since some of the more intensive image recognition operations are offloaded to the computing device 1352. For example, the number of parameters 1311 may be in a range between 10k and 100k. The image classifier 1303 may save power and latency through its relatively small ML model 1326.

Referring to FIG. 13B, in operation 1321, the image classifier 1303 may receive image data 1329 from the imaging sensor(s) 1342 on the device 1302. In operation 1323, the image classifier 1303 may be activated. In operation 1325, the image classifier 1303 may determine the object of interest 1333 is detected in an image frame 1329a of the image data 1329. If the object of interest 1333 is not detected (No), in operation 1328, the image classifier 1303 (and/or the imaging sensor(s) 1342) may transition to a power-saving state. In some examples, after a period of time has elapsed, the image classifier 1303 may be re-activated (e.g., process returns to operation 1323) to determine whether the object of interest 1333 is detected in an image frame 1329a of the image data 1329. If the object of interest 1333 is detected (Yes), in operation 1330, the device 1302 transmits the image frame 1329a to the computing device 1352 over the wireless connection 1348. For example, an RF transceiver 1314 on the device 1302 may transmit the image frame 1329a over the wireless connection 1348. In some examples, the device 1302 compresses the image frame 1329a, and transmits the compressed image frame 1329a to the computing device 1352.

Referring to FIG. 13A, the computing device 1352 includes an object detector 1309 that executes a ML model 1327 (e.g., a larger ML model) to compute a bounding box dataset 1341. In some examples, the bounding box dataset 1341 is an example of object location data. The bounding box dataset 1341 may be data that defines the location in which the object of interest 1333 (e.g., the facial features) are located within the image frame 1329a. In some examples, referring to FIG. 13C, the bounding box dataset 1341 defines coordinates of a bounding box 1381 that includes the object of interest 1333 within the image frame 1329a. In some examples, the coordinates include a height coordinate 1383, a left coordinate 1385, a top coordinate 1387, and a width coordinate 1389. For example, the height coordinate 1383 may be the height of the bounding box 1381 as a ratio of the overall image height. The left coordinate 1385 may be the left coordinate of the bounding box 1381 as a ratio of overall image width. The top coordinate 1387 may be the top coordinate of the bounding box 1381 as a ratio of overall image height. The width coordinate 1389 may be the width of the bounding box 1381 as a ratio of the overall image width.

The ML model 1327 may define a number of parameters 1313 that are required for the ML model 1327 to make a prediction (e.g., computation of the bounding box dataset 1341). In some examples, the number of parameters 1313 is at least ten times greater than the number of parameters 1311. In some examples, the number of parameters 1313 is at least one hundred times greater than the number of parameters 1311. In some examples, the number of parameters 1313 is at least one thousand times greater than the number of parameters 1311. In some examples, the number of parameters 1313 is at least one million times greater than the number of parameters 1311. In some examples, the number of parameters 1313 is in a range between 1M and 10M. In some examples, the number of parameters 1313 is greater than 10M. The computing device 1352 transmits the bounding box dataset 1341 to the device 1302 via the wireless connection 1348.

The device 1302 includes an object tracker 1335 configured to use the bounding box dataset 1341 to track the object of interest 1333 in one or more subsequent image frames 1329b. In some examples, the object tracker 1335 is configured to execute a low-complexity tracking mechanism such as inertial measurement unit (IMU)-based warping, blob detection, or optical flow. For example, the object tracker 1335 may propagate the bounding box dataset 1341 for subsequent image frames 1329b. The object tracker 1335 may include a cropper 1343 and a compressor 1345. The cropper 1343 may use the bounding box dataset 1341 to identify an image region 1347 within the image frame 1329b. The compressor 1345 may compress the image region 1347. For example, the image region 1347 may represent an area within the image frame 1329b that has been cropped and compressed by the object tracker 1335.

The device 1302 may then transmit the image region 1347 to the computing device 1352 over the wireless connection 1348. For example, as the object tracker 1335 is tracking the object of interest 1333, the computing device 1352 may receive a stream of image regions 1347. At the computing device 1352, the object detector 1309 may perform image recognition on the image regions 1347 received from the device 1302 over the wireless connection 1348. In some examples, if the object of interest 1333 is relatively close to the edges of the image regions 1347 (or not present at all), the computing device 1352 may transmit a request to send a new full fame (e.g., a new image frame 1329*a*) to compute the bounding box dataset 1341 again. In some examples, if the image frame 1329*a* does not contain the object of interest 1333, the computing device 1352 may transmit a request to enter a power-saving state to poll for the object of interest. In some examples, a visual indicator 1351 (e.g., a visual box) may be provided on a display 1316 of the device 1302, where the visual indicator 1351 identifies the object of interest 1333 (e.g., the facial features).

Figure 14:
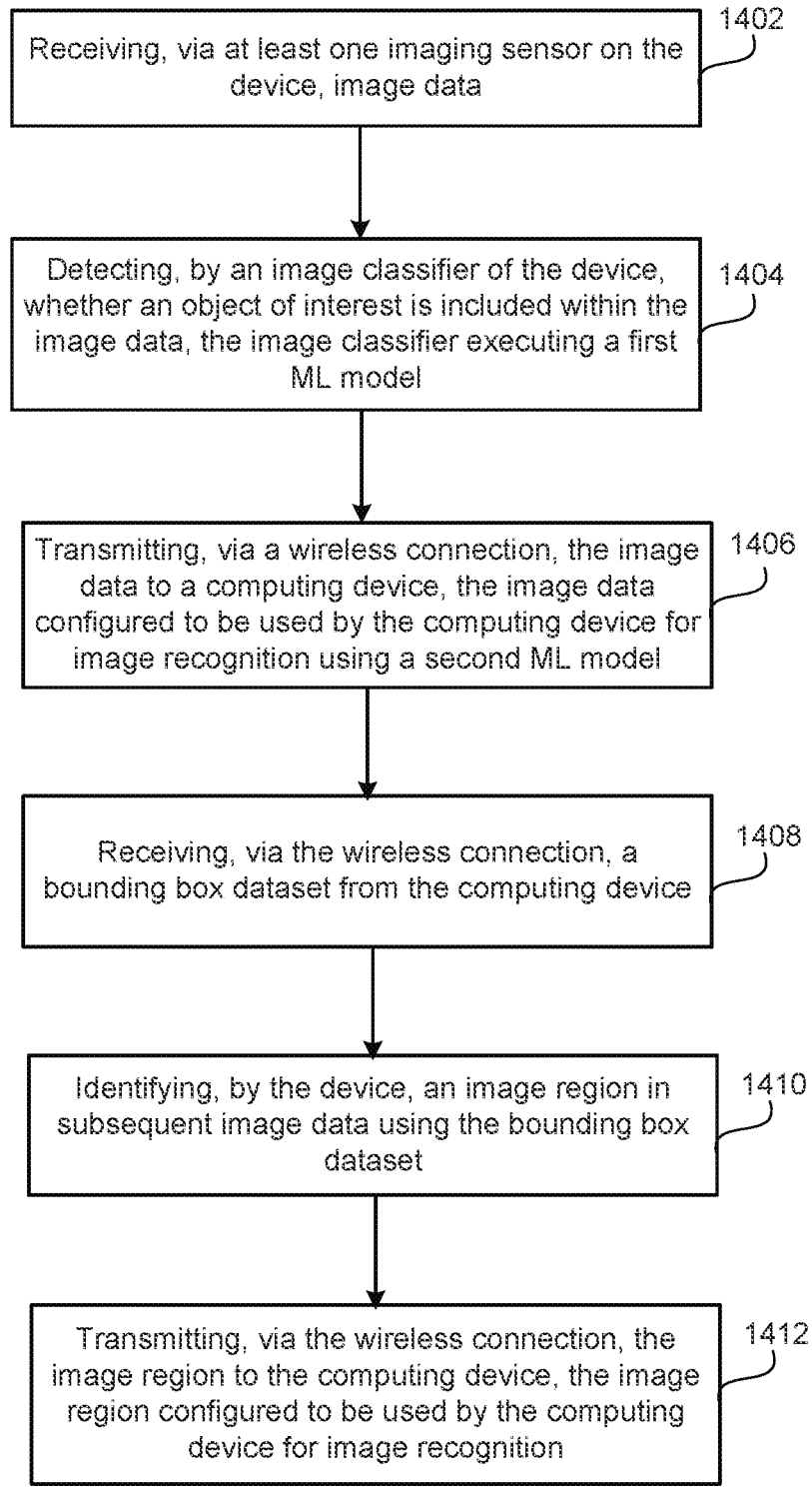
FIG. 14 illustrates a flowchart for image processing using a wearable device according to an aspect.

FIG. 14 is a flowchart 1400 depicting example operations of the system 1300 of FIGS. 13A through 13C. Although the flowchart 1400 of FIG. 14 is explained with respect to the system 1300 of FIGS. 13A through 13C, the flowchart 1400 may be applicable to any of the embodiments discussed herein including the system 100 of FIG. 1, the system 200 of FIG. 2, the system 300 of FIG. 3, the head-mounted display device 402 of FIG. 4, the electronics component 570 of FIG. 5, and/or the electronics component 670 of FIG. 6, the system 700 of FIGS. 7A and 7B. Although the flowchart 1400 of FIG. 14 illustrates the operations in sequential order, it will be appreciated that this is merely an example, and that additional or alternative operations may be included. Further, operations of FIG. 14 and related operations may be executed in a different order than that shown, or in a parallel or overlapping fashion. In some examples, the operations of the flowchart 1400 of FIG. 14 may be combined with the operations of the flowchart 1100 of FIG. 11 and/or the flowchart 1200 of FIG. 12.

Operation 1402 includes receiving, via at least one imaging sensor 1342 on the device 1302, image data 1329. Operation 1404 includes detecting, by an image classifier 1303 of the device 1302, whether or not the object of interest 1333 is included within the image data 1329, where the image classifier 1303 executes a ML model 1326.

Operation 1406 includes transmitting, via the wireless connection 1348, the image data 1329 (e.g., image frame 1329*a*) to a computing device 1352, where the image frame 1329*a* includes the object of interest 1333. The image data 1329 is configured to be used by the computing device 1352 for image recognition using a ML model 1327.

Operation 1408 includes receiving, via the wireless connection 1348, a bounding box dataset 1341 from the computing device 1352. Operation 1410 includes identifying, by the device 1302, an image region 1347 in subsequent image data (e.g., image frame 1329*b*) using the bounding box dataset 1341. Operation 1412 includes transmitting, via the wireless connection 1348, the image region 1347 to the computing device 1352, where the image region 1347 is configured to be used by the computing device 1352 for image recognition.

Figure 15:
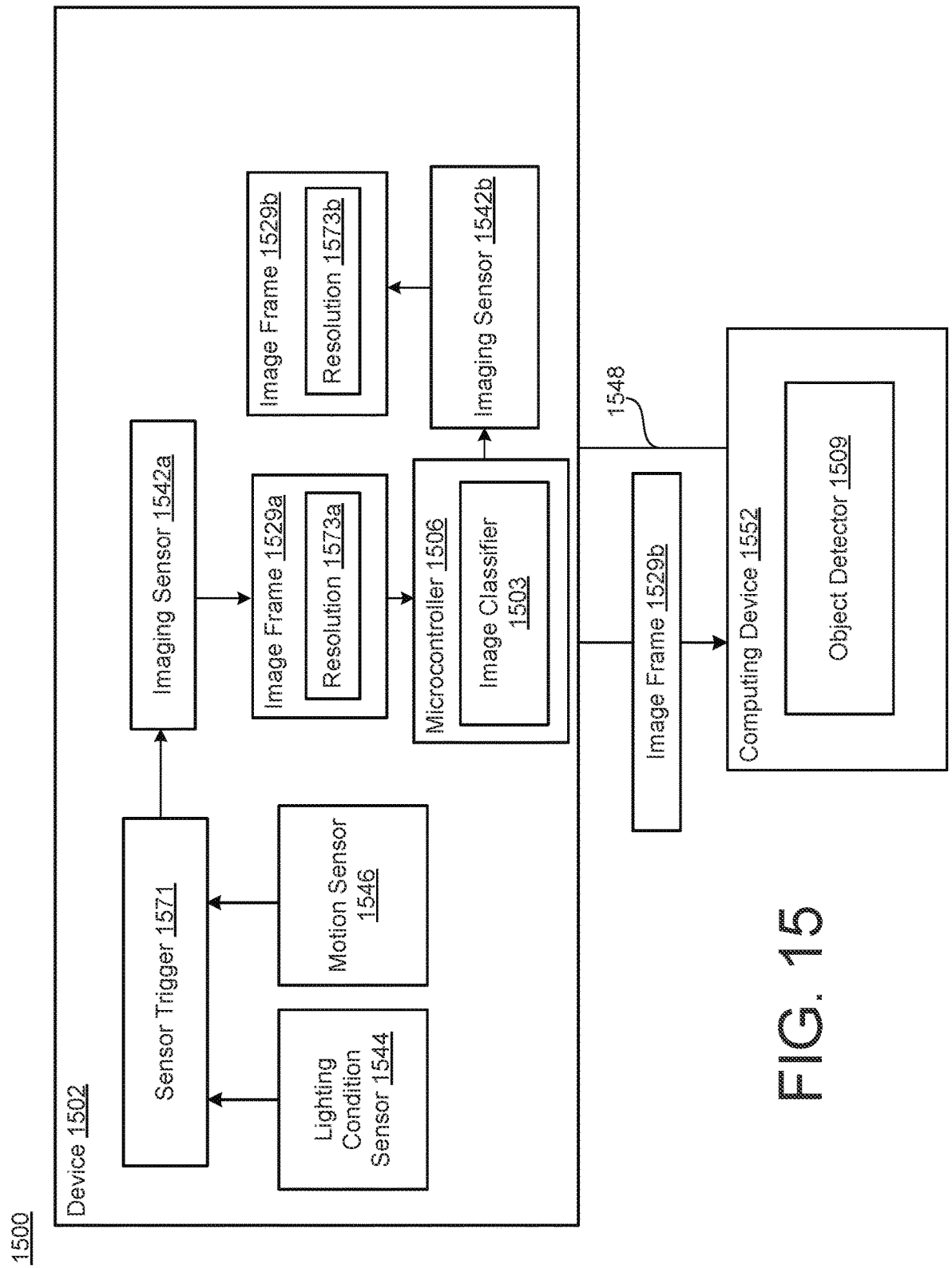
FIG. 15 illustrates a system for image processing using a wearable device and a computing device according to an aspect.

FIG. 15 illustrates a system 1500 for distributing image recognition operations between a device 1502 and a computing device 1552. The system 1500 may be an example of the system 100 of FIG. 1, the system 200 of FIG. 2, the system 300 of FIG. 3, and/or the system 1300 of FIGS. 13A through 13C and may include any of the details discussed with reference to those figures. In some examples, the device 1502 may be an example of the head-mounted display device 402 of FIG. 4 and may include any of the details discussed with reference to that figure. In some examples, the components of the device 1502 may include the electronics component 570 of FIG. 5 and/or the electronics component 670 of FIG. 6. In some examples, the system 1500 also includes the capabilities of distributed sound recognition operations and may include any of the details discussed with reference to the system 700 of FIGS. 7A and 7B, the system 800 of FIG. 8, the system 900 of FIG. 9, and/or the system 1000 of FIG. 10.

As shown in FIG. 15, image recognition operations are distributed between the device 1502 and the computing device 1552. In some examples, the image recognition operations include facial detection and tracking. However, the image recognition operations may include operations to detect (and track) other regions of interest in image data such as objects, text, and barcodes. The device 1502 is connected to the computing device 1552 via a wireless connection 1548 such as a short-term wireless connection such as Bluetooth or NFC connection. In some examples, the wireless connection 1548 is a Bluetooth connection. In some examples, the device 1502 and/or the computing device 1552 include an image recognition application that enables objects to be recognized (and tracked) via image data captured by imaging sensor 1542*a* and imaging sensor 1542*b*.

The imaging sensor 1542*a* may be considered a low power, low resolution (LPLR) image sensor. The imaging sensor 1542*b* may be considered a high power, high resolution (HPHR) image sensor. An image frame 1529*b* captured by the imaging sensor 1542*b* has a resolution 1573*b* that is higher than a resolution 1573*a* of an image frame 1529*a* captured by the imaging sensor 1542*a*. In some examples, the imaging sensor 1542*a* is configured to obtain image data (e.g., image frames 1529*a*) while the device 1502 is activated and coupled to the user (e.g., continuously or periodically captures image frames 1529*a* while the device 1502 is activated). In some examples, the imaging sensor 1542*a* is configured to operate as an always-on sensor. In some examples, the imaging sensor 1542*b* is activated (e.g., for a short duration) in response to the detection of an object of interest, as further discussed below.

The device 1502 includes a lighting condition sensor 1544 configured to estimate a lighting condition for capturing image data. In some examples, the lighting condition sensor 1544 includes an ambient light sensor that detects the amount of ambient light that is present, which can be used to ensure that the image frame 1529*a* is captured with a desired signal-to-noise ratio (SNR). However, the lighting condition sensor 1544 may include other types of photometric (or colorimeter) sensors. The motion sensor 1546 may be used for monitoring device movement such as tilt, shake, rotation, and/or swing and/or for blur estimation. The sensor trigger 1571 may receive lighting condition information from the lighting condition sensor 1544 and motion information from the motion sensor 1546, and, if the lighting condition information and the motion information, indicate that the conditions are acceptable to obtain an image frame 1529*a*, the sensor trigger 1571 may activate the imaging sensor 1542*a* to capture an image frame 1529*a*.

The device 1502 includes a microcontroller 1506 configured to execute an image classifier 1503 that detects whether or not an object of interest is included within the image frame 1529*a* captured by the imaging sensor 1542*a*. Similar to the other embodiments, the image classifier 1503 may include or be defined by a ML model. The ML model may define a number of parameters that are required for the ML model to make a prediction (e.g., whether or not the object of interest is included within the image frame 1529*a*). The ML model may be relatively small since some of the more intensive image recognition operations are offloaded to the computing device 1552. For example, the number of parameters may be in a range between 10k and 100k. The image classifier 1503 may save power and latency through its relatively small ML model.

If the image classifier 1503 detects the existence of the object of interest within the image frame 1529*a*, the image classifier 1503 is configured to trigger the imaging sensor 1542*b* to capture the image frame 1529*b*. As indicated above, the image frame 1529*b* has a resolution 1573*b* that is higher than the resolution 1573*a* of the image frame 1529*a*. The device 1502 transmits the image frame 1529*b* to the computing device 1552 via the wireless connection 1548 for further processing. In some examples, the device 1502 compresses the image frame 1529*b*, and then transmits the compressed image frame 1529*b* to the computing device 1552. In some examples, the motion information and/or the lighting condition information is used to determine whether to transmit the image frame 1529*b*. For example, if the motion information indicates motion above a threshold level (e.g., motion is high), the image frame 1529*b* may not be transmitted, and the microcontroller 1506 may activate the imaging sensor 1542*b* to capture another image frame. If the lighting condition information indicates that the lighting condition is below a threshold level, the image frame 1529*b* may not be transmitted, and the microcontroller 1506 may activate the imaging sensor 1542*b* to capture another image frame.

The computing device 1552 includes an object detector 1509 configured to perform image recognition operations (including the computation of a bounding box dataset) using the image frame 1529*b*. Similar to the embodiment of system 1300 of FIGS. 13A through 13C, the object detector 1509 executes a larger ML model to compute a bounding box dataset using the higher resolution image (e.g., the image frame 1529*b*), which is transmitted back to the device 1502 via the wireless connection 1548. Then, the device 1502 uses the bounding box dataset to track the object of interest in one or more subsequent image frames. For example, the device 1502 may use a low-complexity tracking mechanism such as inertial measurement unit (IMU)-based warping, blob detection, or optical flow to propagate the bounding box dataset for subsequent image frames. The device 1502 may use the bounding box dataset to identify an image region within the image frame 1529*b*, and the device 1502 may compress the image region, which is then transmitted back to the computing device 1552 for image recognition.

Figure 16:
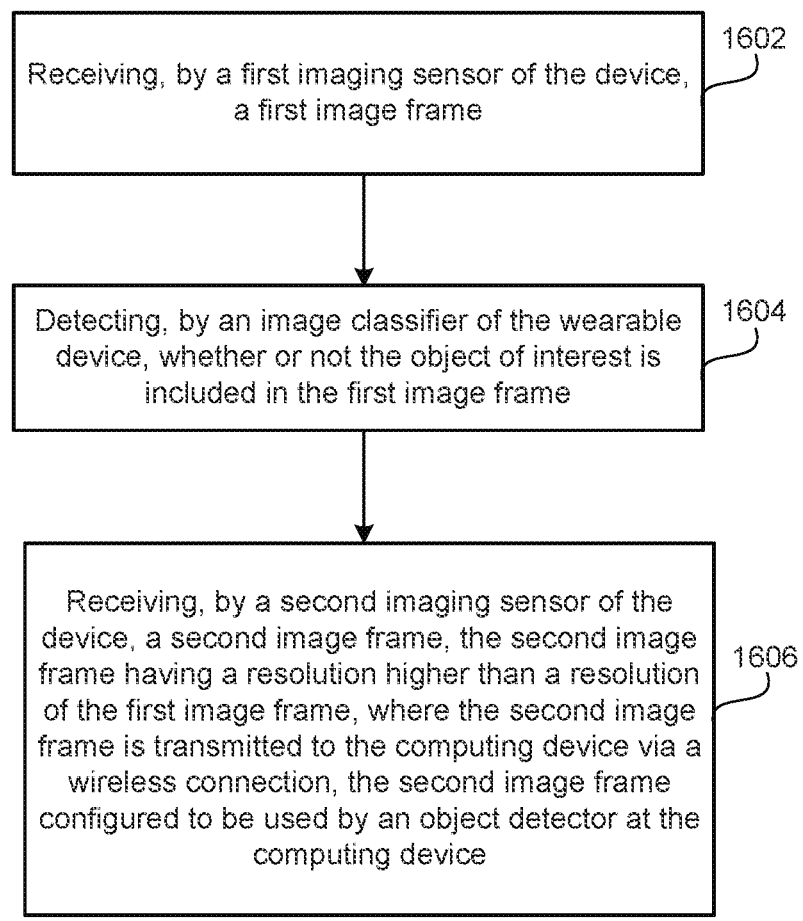
FIG. 16 illustrates a flowchart for image processing using a wearable device according to an aspect.

FIG. 16 is a flowchart 1600 depicting example operations of the system 1500 of FIG. 15. Although the flowchart 1600 of FIG. 16 is explained with respect to the system 1500 of FIG. 15, the flowchart 1600 may be applicable to any of the embodiments discussed herein including the system 100 of FIG. 1, the system 200 of FIG. 2, the system 300 of FIG. 3, the head-mounted display device 402 of FIG. 4, the electronics component 570 of FIG. 5, the electronics component 670 of FIG. 6, and/or the system 1300 of FIG. 13. Although the flowchart 1600 of FIG. 16 illustrates the operations in sequential order, it will be appreciated that this is merely an example, and that additional or alternative operations may be included. Further, operations of FIG. 16 and related operations may be executed in a different order than that shown, or in a parallel or overlapping fashion. In some examples, the operations of the flowchart 1600 of FIG. 16 may be combined with the operations of the flowchart 1100 of FIG. 11, the flowchart 1200 of FIG. 12, and/or the flowchart 1400 of FIG. 14.

Operation 1602 includes receiving, by a first imaging sensor (e.g., imaging sensor 1542*a*) of the device 1502, a first image frame 1529*a*. Operation 1604 includes detecting, by an image classifier 1503 of the device 1502, the presence of the object of interest in the first image frame 1529*a*.

Operation 1606 includes receiving, by a second imaging sensor (e.g., imaging sensor 1542*b*) of the device 1502, a second image frame 1529*b*, the second image frame 1529*b* having a resolution 1573*b* higher than a resolution 1573*a* of the first image frame 1529*a*, where the second image frame 1529*b* is transmitted to the computing device 1552 via a wireless connection 1548, and the second image frame 1529*b* is configured to be used by an object detector 1509 at the computing device 1552.

Figure 17:
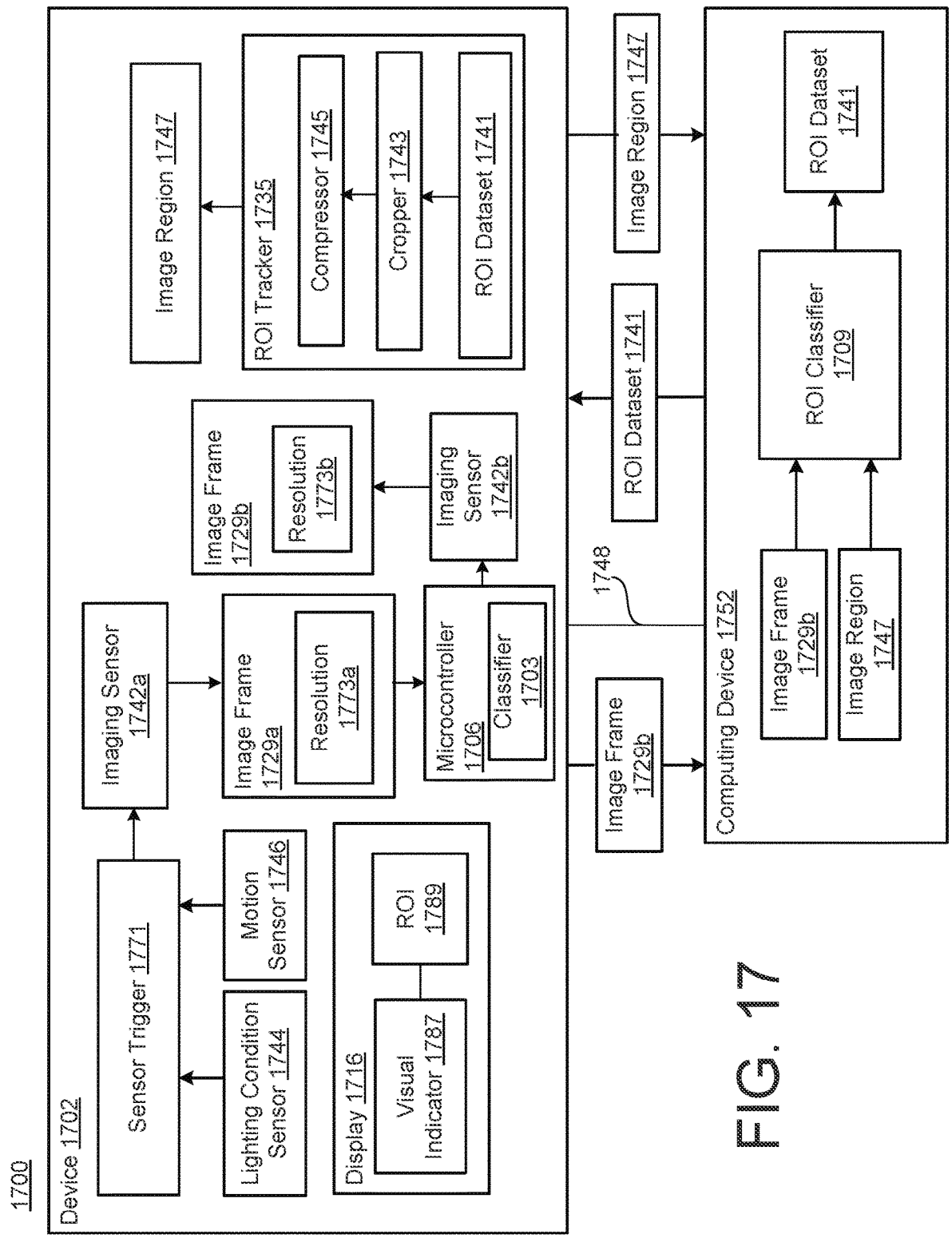
FIG. 17 illustrates a system for image processing using a wearable device and a computing device according to an aspect.

FIG. 17 illustrates a system 1700 for distributing image recognition operations between a device 1702 and a computing device 1752. The system 1700 may be an example of the system 100 of FIG. 1, the system 200 of FIG. 2, the system 300 of FIG. 3, the system 1300 of FIGS. 13A through 13C, and/or the system 1500 of FIG. 15 and may include any of the details discussed with reference to those figures. In some examples, the device 1702 may be an example of the head-mounted display device 402 of FIG. 4 and may include any of the details discussed with reference to that figure. In some examples, the components of the device 1702 may include the electronics component 570 of FIG. 5 and/or the electronics component 670 of FIG. 6. In some examples, the system 1700 also includes the capabilities of distributed sound recognition operations and may include any of the details discussed with reference to the system 700 of FIGS. 7A and 7B, the system 800 of FIG. 8, the system 900 of FIG. 9, and/or the system 1000 of FIG. 10.

As shown in FIG. 17, image recognition operations are distributed between the device 1702 and the computing device 1752. In some examples, the image recognition operations include facial detection and tracking. However, the image recognition operations may include operations to detect (and track) other regions of interest in image data such as objects, text, and barcodes. The device 1702 is connected to the computing device 1752 via a wireless connection 1748 such as a short-term wireless connection such as Bluetooth or NFC connection. In some examples, the wireless connection 1748 is a Bluetooth connection. In some examples, the device 1702 and/or the computing device 1752 include an image recognition application that enables objects to be recognized (and tracked) via image data captured by imaging sensor 1742*a* and imaging sensor 1742*b*.

The imaging sensor 1742*a* may be considered a low power, low resolution (LPLR) image sensor. The imaging sensor 1742*b* may be considered a high power, high resolution (HPHR) image sensor. An image frame 1729*b* captured by the imaging sensor 1742*b* has a resolution 1773*b* that is higher than a resolution 1773*a* of an image frame 1729*a* captured by the imaging sensor 1742*a*. In some examples, the imaging sensor 1742*a* is configured to obtain image data (e.g., image frames 1729*a*) while the device 1702 is activated and coupled to the user (e.g., continuously or periodically captures image frames 1729*a* while the device 1702 is activated). In some examples, the imaging sensor 1742*a* is configured to operate as an always-on sensor. In some examples, the imaging sensor 1742*b* is activated (e.g., for a short duration) in response to the detection of an object of interest, as further discussed below.

The device 1702 includes a lighting condition sensor 1744 configured to estimate a lighting condition for capturing image data. In some examples, the lighting condition sensor 1744 includes an ambient light sensor that detects the amount of ambient light that is present, which can be used to ensure that the image frame 1729a is captured with a desired signal-to-noise ratio (SNR). However, the lighting condition sensor 1744 may include other types of photometric (or colorimeter) sensors. The motion sensor 1746 may be used for monitoring device movement such as tilt, shake, rotation, and/or swing and/or for blur estimation. The sensor trigger 1771 may receive lighting condition information from the lighting condition sensor 1744 and motion information from the motion sensor 1746, and, if the lighting condition information and the motion information, indicate that the conditions are acceptable to obtain an image frame 1729a, the sensor trigger 1771 may activate the imaging sensor 1742a to capture an image frame 1729a.

The device 1702 includes a microcontroller 1706 configured to execute a classifier 1703 that detects whether or not a region of interest (ROI) 1789 is included within the image frame 1729a captured by the imaging sensor 1742a. The ROI 1789 can also be referred to as an object of interest. The classifier 1703 may include or be defined by a ML model. The ML model may define a number of parameters that are required for the ML model to make a prediction (e.g., whether or not the ROI 1789 is included within the image frame 1729a). The ML model may be relatively small since some of the more intensive image recognition operations are offloaded to the computing device 1752. For example, the number of parameters may be in a range between 10k and 100k. The classifier 1703 may save power and latency through its relatively small ML model.

If the classifier 1703 detects the existence of the ROI 1789 within the image frame 1729a, the classifier 1703 is configured to trigger the imaging sensor 1742b to capture the image frame 1729b. As indicated above, the image frame 1729b has a resolution 1773b that is higher than the resolution 1773a of the image frame 1729a. The device 1702 transmits the image frame 1729b to the computing device 1752 via the wireless connection 1748 for further processing. In some examples, the device 1702 compresses the image frame 1729b, and transmits the compressed image frame 1729b to the computing device 1752.

The computing device 1752 includes a ROI classifier 1709 that executes a ML model (e.g., a larger ML model) to compute a ROI dataset 1741. In some examples, the ROI dataset 1741 is an example of the object location data and/or the bounding box dataset. The ROI dataset 1741 may be data that defines the location in which the ROI 1789 are located within the image frame 1729b. The computing device 1752 may transmit the ROI dataset 1741 to the device 1702 via the wireless connection 1748.

The device 1702 includes an ROI tracker 1735 configured to use the ROI dataset 1741 to track the ROI 1789 in one or more subsequent image frames. In some examples, the ROI tracker 1735 is configured to execute a low-complexity tracking mechanism such as inertial measurement unit (IMU)-based warping, blob detection, or optical flow. For example, the ROI classifier 1709 may propagate the ROI dataset 1741 for subsequent image frames. The ROI tracker 1735 may include a cropper 1743 and a compressor 1745. The cropper 1743 may use the ROI dataset 1741 to identify an image region 1747 within the image frame 1729b. The compressor 1745 may compress the image region 1747. For example, the image region 1747 may represent an area within the image frame 1729b that has been cropped and compressed by the ROI tracker 1735, where the image region 1747 includes the ROI 1789.

The device 1702 may then transmit the image region 1747 to the computing device 1752 over the wireless connection 1748. For example, as the ROI tracker 1735 is tracking the ROI 1789, the computing device 1752 may receive a stream of image regions 1747. At the computing device 1752, the ROI classifier 1709 may perform object detection on the image regions 1747 received from the device 1702 over the wireless connection 1748. In some examples, if the ROI 1789 is relatively close to the edges of the image regions 1747 (or not present at all), the computing device 1752 may transmit a request to send a new full fame (e.g., a new image frame 1729b) to compute the ROI dataset 1741 again. In some examples, if the image frame 1729a does not contain the ROI 1789, the computing device 1752 may transmit a request to enter a power-saving state to poll for ROIs 1789. In some examples, a visual indicator 1787 is provided on a display 1716 of the device 1702, where the visual indicator 1787 identifies the ROI 1789.

Figure 18:
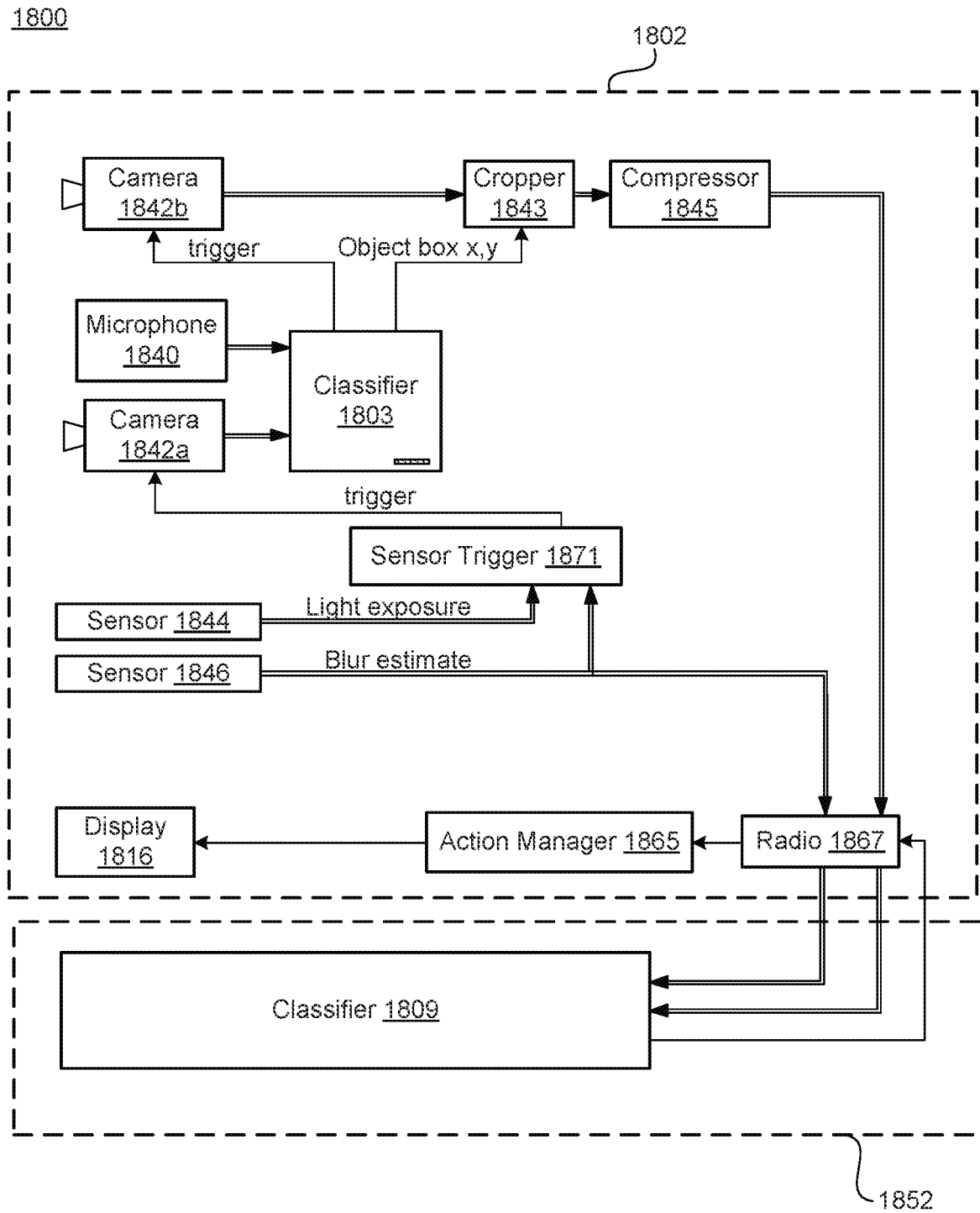
FIG. 18 illustrates a system for audio and/or image processing using a wearable device and a computing device according to an aspect.

FIG. 18 illustrates a system 1800 for distributing image recognition operations between a device 1802 and a computing device 1852. The system 1800 may be an example of the system 100 of FIG. 1, the system 200 of FIG. 2, the system 300 of FIG. 3, the system 1300 of FIGS. 13A through 13C, the system 1500 of FIG. 15, and the system 1700 of FIG. 17 and may include any of the details discussed with reference to those figures. In some examples, the device 1802 may be an example of the head-mounted display device 402 of FIG. 4 and may include any of the details discussed with reference to that figure. In some examples, the components of the device 1802 may include the electronics component 570 of FIG. 5 and/or the electronics component 670 of FIG. 6. In some examples, the system 1800 also includes the capabilities of distributed sound recognition operations and may include any of the details discussed with reference to the system 700 of FIGS. 7A and 7B, the system 800 of FIG. 8, the system 900 of FIG. 9, and/or the system 1000 of FIG. 10.

As shown in FIG. 18, image recognition operations are distributed between the device 1802 and the computing device 1852. In some examples, the image recognition operations include facial detection and tracking. However, the image recognition operations may include operations to detect (and track) other regions of interest in image data such as objects, text, and barcodes. The device 1802 is connected to the computing device 1852 via a wireless connection (e.g., radio resources 1867) such as a short-term wireless connection such as Bluetooth or NFC connection. In some examples, the wireless connection is a Bluetooth connection. In some examples, the device 1802 and/or the computing device 1852 include an image recognition application that enables objects to be recognized (and tracked) via image data captured by camera 1842a and camera 1842b.

The camera 1842a may be considered a low power, low resolution (LPLR) camera. The camera 1842b may be considered a high power, high resolution (HPHR) camera. An image frame captured by the camera 1842b has a resolution that is higher than a resolution of an image frame captured by the camera 1842a. In some examples, the camera 1842a is configured to obtain image data while the device 1802 is activated and coupled to the user (e.g., continuously or periodically captures image frames while the device 1802 is activated). In some examples, the camera 1842a is configured to operate as an always-on sensor. In some examples, the camera 1842b is activated (e.g., for a short duration) in response to the detection of an object of interest, as further discussed below.

The device 1802 includes a lighting condition sensor 1844 configured to estimate a lighting condition for capturing image data. In some examples, the lighting condition sensor 1844 includes an ambient light sensor that detects the amount of ambient light that is present, which can be used to ensure that the image frame is captured with a desired signal-to-noise ratio (SNR). However, the lighting condition sensor 1844 may include other types of photometric (or colorimeter) sensors. The motion sensor 1846 may be used for monitoring device movement such as tilt, shake, rotation, and/or swing and/or for blur estimation. The sensor trigger 1871 may receive lighting condition information from the lighting condition sensor 1844 and motion information (e.g., blur estimate) from the motion sensor 1846, and, if the lighting condition information and the motion information, indicate that the conditions are acceptable to obtain an image frame, the sensor trigger 1871 may activate the camera 1842*a* to capture an image frame with a lower resolution. In some examples, the device 1802 includes a microphone 1840 that provides audio data to the classifier 1803.

The device 1802 includes a classifier 1803 that detects whether or not a region of interest is included within the image frame captured by the camera 1842*a*. The classifier 1803 may include or be defined by a ML model. The ML model may define a number of parameters that are required for the ML model to make a prediction (e.g., whether or not a region of interest is included within the image frame). The ML model may be relatively small since some of the more intensive image recognition operations are offloaded to the computing device 1852. For example, the number of parameters may be in a range between 10k and 100k. The classifier 1803 may save power and latency through its relatively small ML model.

If the classifier 1803 detects the existence of a region of interest within the image frame captured by the camera 1842*a*, the classifier 1803 is configured to trigger the camera 1842*b* to capture a higher resolution image. In some examples, the device 1802 transmits the full image frame captured by the camera 1842*b* via radio resources 1867.

The computing device 1852 includes a classifier 1809 that executes a ML model (e.g., a larger ML model) to compute a ROI dataset (e.g., object box, x, y). The ROI dataset may be data that defines the location in which the object of interest is located within the image frame. The computing device 1852 may transmit the ROI dataset to the device 1802. The classifier 1803 may provide the ROI dataset to a copper 1843 that crops the subsequent image frames to identify an image region. The image region is compressed by a compressor 1845 and transmitted to the computing device 1852 via the radio resources 1867. In some examples, the device 1802 includes an action manager 1865 that receives the ROI detection from the classifier 1809 and may provide a visual indicator or other action on a display 1816 of the device 1802.

Figure 19:
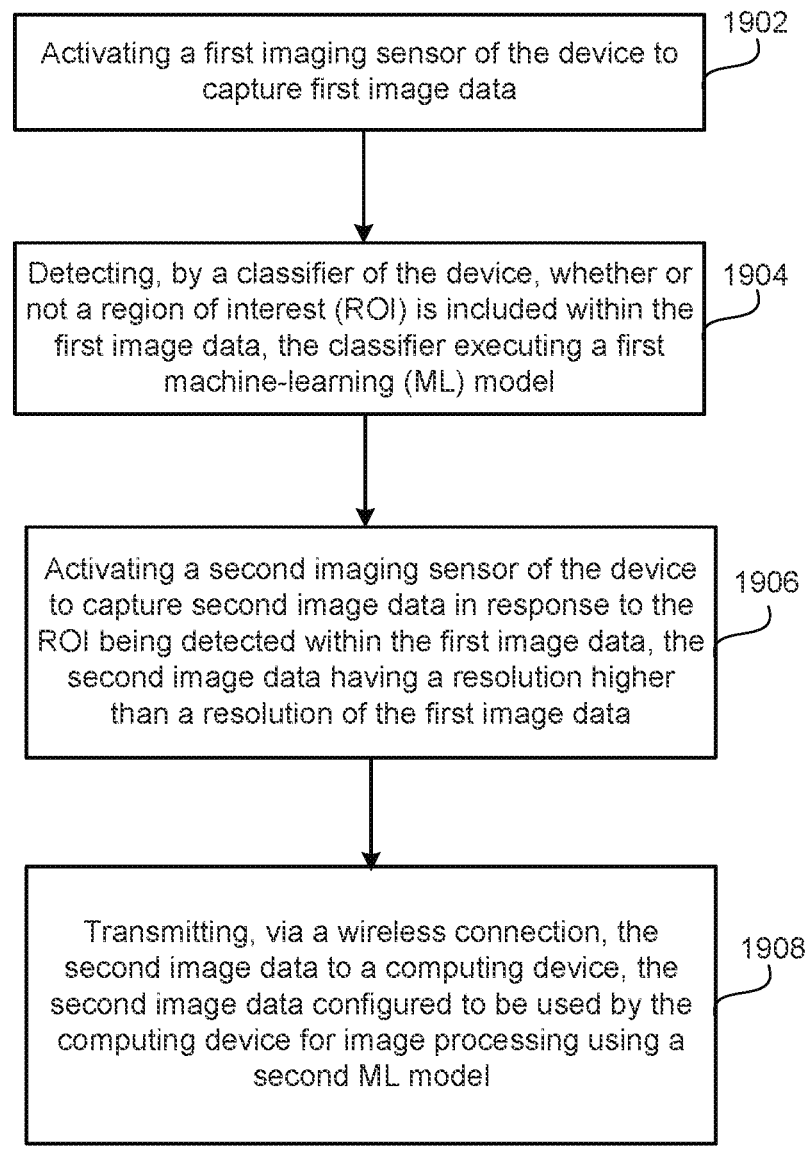
FIG. 19 illustrates a flowchart for image processing using a wearable device according to an aspect.

FIG. 19 is a flowchart 1900 depicting example operations of the system 1700 of FIG. 17. Although the flowchart 1900 of FIG. 19 is explained with respect to the system 1700 of FIG. 17, the flowchart 1900 may be applicable to any of the embodiments discussed herein including the system 100 of FIG. 1, the system 200 of FIG. 2, the system 300 of FIG. 3, the head-mounted display device 402 of FIG. 4, the electronics component 570 of FIG. 5, the electronics component 670 of FIG. 6, the system 700 of FIGS. 7A and 7B, the system 800 of FIG. 8, the system 900 of FIG. 9, the system 1000 of FIG. 10, the system 1300 of FIGS. 13A through 13C, the system 1500 of FIG. 15, and/or the system 1800 of FIG. 18. Although the flowchart 1900 of FIG. 19 illustrates the operations in sequential order, it will be appreciated that this is merely an example, and that additional or alternative operations may be included. Further, operations of FIG. 19 and related operations may be executed in a different order than that shown, or in a parallel or overlapping fashion. In some examples, the operations of the flowchart 1900 of FIG. 19 may be combined with the operations of the flowchart 1100 of FIG. 11, the flowchart 1200 of FIG. 12, the flowchart 1400 of FIG. 14, and/or the flowchart 1600 of FIG. 16.

Operation 1902 includes activating a first imaging sensor 1742*a* of the device 1702 to capture first image data (e.g., image frame 1729*a*). Operation 1904 includes detecting, by a classifier 1703 of the device 1702, whether or not a region of interest (ROI) 1789 is included within the first image data, where the classifier 1703 executes a ML model.

Operation 1906 includes activating a second imaging sensor 1742*b* of the device 1702 to capture second image data (e.g., image frame 1729*b*) in response to the ROI 1789 being detected within the first image data. The second image data has a resolution 1773*b* higher than a resolution 1773*a* of the first image data. Operation 1908 includes transmitting, via the wireless connection 1748, the second imaging data to a computing device 1752, where the second image data 1729*b* is used by the computing device 1752 for image processing using a ML model.

Figure 20:
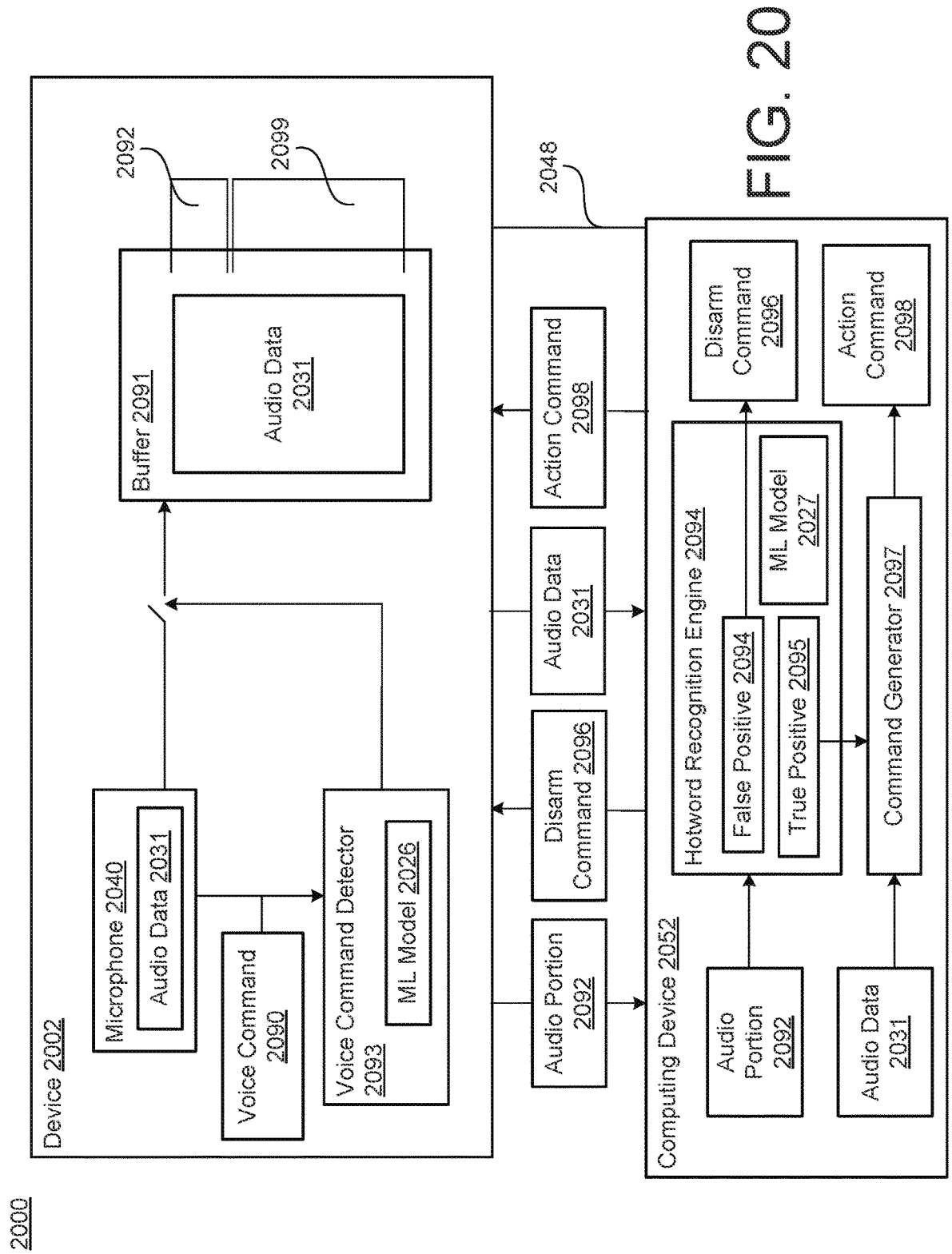
FIG. 20 illustrates a system for audio processing using a wearable device and a computing device according to an aspect.

FIG. 20 illustrates a system 2000 for distributing image recognition operations between a device 2002 and a computing device 2052. The system 2000 may be an example of the system 100 of FIG. 1, the system 200 of FIG. 2, and/or the system 300 of FIG. 3 and may include any of the details discussed with reference to those figures. In some examples, the device 2002 may be an example of the head-mounted display device 402 of FIG. 4 and may include any of the details discussed with reference to that figure. In some examples, the components of the device 2002 may include the electronics component 570 of FIG. 5 and/or the electronics component 670 of FIG. 6. In some examples, the system 2000 also includes the capabilities of distributed sound recognition operations and may include any of the details discussed with reference to the system 700 of FIGS. 7A and 7B, the system 800 of FIG. 8, the system 900 of FIG. 9, and/or the system 1000 of FIG. 10. In some examples, the system 2000 also includes the capabilities of distributed image recognition operations may include any of the details discussed with reference to the system 1300 of FIGS. 13A through 13C, the system 1500 of FIG. 15, the system 1700 of FIG. 17, and the system 1800 of FIG. 18.

As shown in FIG. 20, hotword recognition operations for voice commands are distributed between the device 2002 and the computing device 2052. The device 2002 may include a voice command detector 2093 that executes a ML model 2026 (e.g., a gatekeeping model) to continuously (e.g., periodically) process microphone samples (e.g., audio data 2031) from a microphone 2040 on the device 2002 for an initial portion of a hot-word (e.g., "ok G" or "ok D") for a voice command 2090. If the voice command detector 2093 detects that initial portion, the voice command detector 2093 may cause a buffer 2091 to capture the subsequent audio data 2031. Also, the device 2002 may transmit an audio portion 2092 to the computing device 2052 over the wireless connection 2048. In some examples, the device 2002 compresses the audio portion 2092, and then transmits the compressed audio portion 2092. The audio portion 2092 may be a portion of the buffer. For example, the audio portion 2092 may be 1-2 seconds of audio data 2031 from the head of the buffer 2091.

The computing device 2052 includes a hot-word recognition engine 2094 configured to execute a ML model 2027 (e.g., a larger ML model) to perform the full hot-word recognition using the audio portion 2092. For example, the ML model 2027 receives the audio portion 2092 as an input, and the ML model 2027 predicts whether the audio portion 2092 includes a hot-word (e.g., "ok Google, Ok device"). If the audio portion 2092 is a false positive 2094, the computing device 2052 may transmit a disarm command 2096 to the device 2002, which discards the contents (e.g., the audio data 2031) of the buffer 2091. If the audio portion 2092 is a true positive 2095, the remainder 2099 of the buffer 2091 is transmitted to the computing device 2052. In some examples, the device 2002 compresses the audio data 2031 within the buffer 2091 (or the remainder 2099 of the buffer 2091) and transmits the compressed audio data 2031 to the computing device 2052. The computing device 2052 includes a command generator 2097 that uses the audio data 2031 (e.g., the remainder 2099 of the buffer 2091 and the audio portion 2092) to determine an action command 2098 (e.g., compose an email, take a picture, etc.). The computing device 2052 may transmit the action command 2098 to the device 2002 over the wireless connection 2048.

Figure 21:
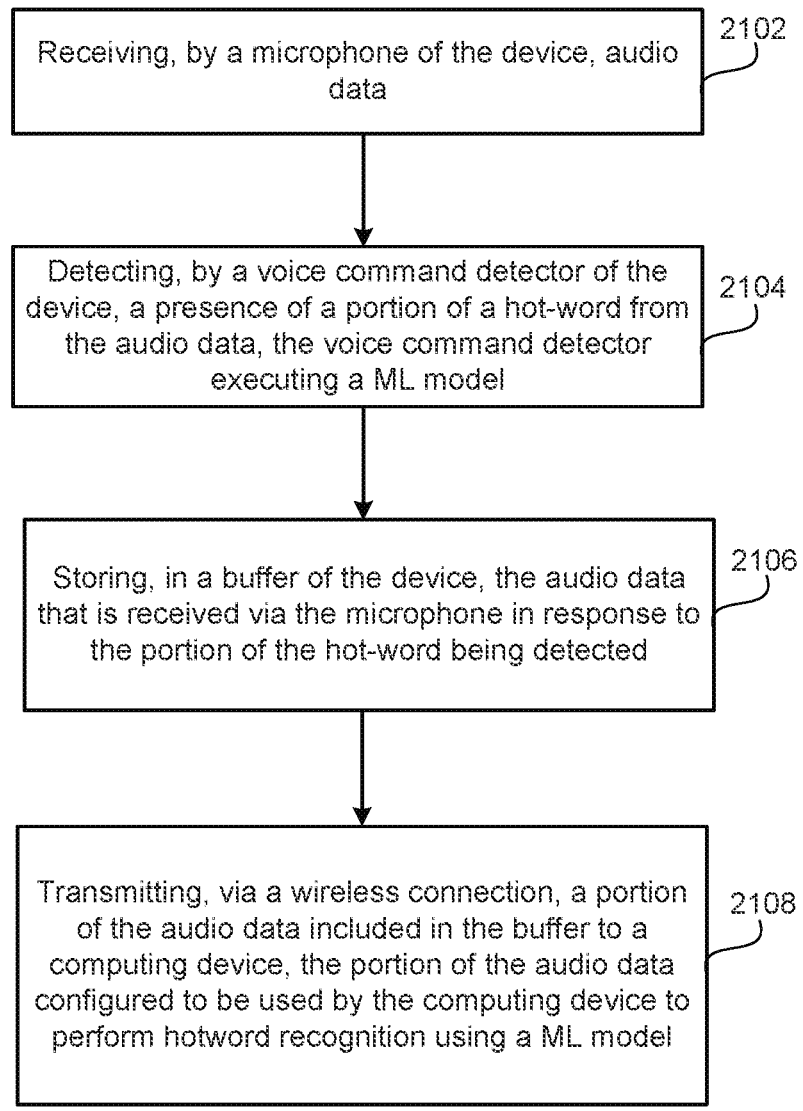
FIG. 21 illustrates a flowchart for audio processing using a wearable device according to an aspect.

FIG. 21 is a flowchart 2100 depicting example operations of the system 2000 of FIG. 20. Although the flowchart 2100 of FIG. 21 is explained with respect to the system 2000 of FIG. 20, the flowchart 2100 may be applicable to any of the embodiments discussed herein including the system 100 of FIG. 1, the system 200 of FIG. 2, the system 300 of FIG. 3, the head-mounted display device 402 of FIG. 4, the electronics component 570 of FIG. 5, the electronics component 670 of FIG. 6, the system 700 of FIGS. 7A and 7B, the system 800 of FIG. 8, the system 900 of FIG. 9, the system 1000 of FIG. 10, the system 1300 of FIGS. 13A through 13C, the system 1500 of FIG. 15, and/or the system 1800 of FIG. 18. Although the flowchart 2100 of FIG. 21 illustrates the operations in sequential order, it will be appreciated that this is merely an example, and that additional or alternative operations may be included. Further, operations of FIG. 21 and related operations may be executed in a different order than that shown, or in a parallel or overlapping fashion. In some examples, the operations of the flowchart 2100 of FIG. 21 may be combined with the operations of the flowchart 1100 of FIG. 11, the flowchart 1200 of FIG. 12, the flowchart 1400 of FIG. 14, the flowchart 1600 of FIG. 16, and/or the flowchart 1900 of FIG. 19.

Operation 2102 includes receiving, via a microphone 2040 of the device 2002, audio data 2031. Operation 2104 includes detecting, by a voice command detector 2093, a presence of a portion of a hotword from the audio data 2031, where the voice command detector 2093 executes a ML model.

Operation 2106 includes storing, in a buffer 2091 of the device 2002, the audio data 2031 that is received via the microphone 2040 in response to the portion of the hot-word being detected. Operation 2108 includes transmitting, via a wireless connection 2048, an audio portion 2092 of the buffer 2091 to a computing device 2052, where the audio portion 2092 of the buffer 2091 is configured to be used by the computing device 2052 to perform hotword recognition.

Although the disclosed inventive concepts include those defined in the attached claims, it should be understood that the inventive concepts can also be defined in accordance with the following embodiments:

Embodiment 1 is a method for distributed sound recognition using a wearable device comprising: receiving, via a microphone of the wearable device, audio data; detecting, by a sound classifier of the wearable device, whether or not the audio data includes a sound of interest; and transmitting, via a wireless connection, the audio data to a computing device in response to the sound of interest being detected within the audio data.

Embodiment 2 is the method of embodiment 1, wherein the sound classifier executes a first machine learning (ML) model.

Embodiment 3 is the method of any of embodiments 1 through 2, wherein the audio data is configured to be used by the computing device or a server computer for further sound recognition using a second ML model.

Embodiment 4 is the method of any of embodiments 1 through 3, wherein the audio data is configured to be used by the computing device for further sound recognition.

Embodiment 5 is the method of any of embodiments 1 through 4, wherein the audio data is configured to be used by the server computer for further sound recognition.

Embodiment 6 is the method of any of embodiments 1 through 5, wherein the server computer is connected to the computing device over a network.

Embodiment 7 is the method of any of embodiments 1 through 6, wherein the sound of interest includes speech.

Embodiment 8 is the method of any of embodiments 1 through 7, wherein the audio data is configured to be used by the computing device or the server computer to translate the speech to text data using the second ML model.

Embodiment 9 is the method of any of embodiments 1 through 8, wherein the method further comprises receiving, via the wireless connection, the text data from the computing device.

Embodiment 10 is the method of any of embodiments 1 through 9, wherein the speech is in a first language, and the text data is in a second language, the second language being different from the first language.

Embodiment 11 is the method of any of embodiments 1 through 10, further comprising displaying the text data on a display of the wearable device.

Embodiment 12 is the method of any of embodiments 1 through 11, further comprising compressing the audio data, wherein the compressed audio data is transmitted to the computing device via the wireless connection.

Embodiment 13 is the method of any of embodiments 1 through 12, further comprising extracting features from the audio data, wherein the extracted features are transmitted to the computing device via the wireless connection.

Embodiment 14 is the method of any of embodiments 1 through 13, wherein the wireless connection is a short-range wireless connection.

Embodiment 15 is the method of any of embodiments 1 through 14, wherein the wearable device includes smartglasses.

Embodiment 16 is a system comprising one or more computers and one or more storage devices storing instructions that are operable, when executed by the one or more computers, to cause the one or more computers to perform the method of any one of embodiments 1 through 15.

Embodiment 17 is a wearable device configured to perform any of the embodiments 1 through 15.

Embodiment 18 is a computer storage medium encoded with a computer program, the program comprising instructions that are operable, when executed by data processing apparatus, to cause the data processing apparatus to perform the method of any of embodiments 1 through 15.

Embodiment 19 is a non-transitory computer-readable medium storing executable instructions that when executed by at least one processor cause the at least one processor to receive audio data from a microphone of a wearable device, detect, by a sound classifier of the wearable device, whether or not the audio data includes a sound of interest, and transmit, via a wireless connection, the audio data to a computing device in response to the sound of interest being detected within the audio data.

Embodiment 20 is the non-transitory computer-readable medium of embodiment 19, wherein the sound classifier is configured to execute a first machine learning (ML) model.

Embodiment 21 is the non-transitory computer-readable medium of any of embodiments 19 through 20, wherein the audio data is configured to be used by the computing device for further sound recognition using a second ML model.

Embodiment 22 is the non-transitory computer-readable medium of any of embodiments 19 through 21, wherein the executable instructions include instructions that when executed by the at least one processor cause the at least one processor to continue to detect, by the sound classifier, whether or not the audio data includes the sound of interest in response to the sound of interest not being detected within the audio data.

Embodiment 23 is the non-transitory computer-readable medium of any of embodiments 19 through 22, wherein the sound of interest includes speech.

Embodiment 23 is the non-transitory computer-readable medium of any of embodiments 19 through 22, wherein the audio data is configured to be used by the computing device to translate the speech to text data using the second ML model.

Embodiment 24 is the non-transitory computer-readable medium of any of embodiments 19 through 23, wherein the executable instructions include instructions that when executed by the at least one processor cause the at least one processor to receive, via the wireless connection, the text data from the computing device.

Embodiment 25 is the non-transitory computer-readable medium of any of embodiments 19 through 24, wherein the executable instructions include instructions that when executed by the at least one processor cause the at least one processor to compress the audio data, wherein the compressed audio data is transmitted to the computing device via the wireless connection.

Embodiment 26 is the non-transitory computer-readable medium of any of embodiments 19 through 25, wherein the executable instructions include instructions that when executed by the at least one processor cause the at least one processor to extract features from the audio data, wherein the extracted features are transmitted to the computing device via the wireless connection.

Embodiment 27 is the non-transitory computer-readable medium of any of embodiments 19 through 26, wherein the wearable device includes smartglasses.

Embodiment 28 is the non-transitory computer-readable medium of any of embodiments 19 through 27, wherein the computing device includes a smartphone.

Embodiment 29 is a method that includes operations of the non-transitory computer-readable medium of any of embodiments 19 through 28.

Embodiment 30 is a wearable device that includes the features of any of embodiments 19 through 28.

Embodiment 31 is a wearable device for distributed sound recognition, the wearable device comprising a microphone configured to receive audio data, a sound classifier configured to detect whether or not the audio data includes a sound of interest, and a radio frequency (RF) transceiver configured to transmit the audio data to a computing device via a wireless connection in response to the sound of interest being detected within the audio data.

Embodiment 32 is the wearable device of embodiment 31, wherein the sound classifier includes a first machine learning (ML) model.

Embodiment 33 is the wearable device of any of embodiments 29 through 32, wherein the audio data is configured to be used by the computing device or a server computer to translate the sound of interest to text data using a second ML model.

Embodiment 34 is the wearable device of any of embodiments 29 through 33, wherein the RF transceiver is configured to receive the text data from the computing device over the wireless connection.

Embodiment 35 is the wearable device of any of embodiments 29 through 34, wherein the wearable device further comprises a display configured to display the text data.

Embodiment 36 is the wearable device of any of embodiments 29 through 35, wherein the wearable device includes smartglasses.

Embodiment 37 is the wearable device of any of embodiments 29 through 36, wherein the wireless connection is a Bluetooth connection.

Embodiment 38 is a computing device for sound recognition including at least one processor; and a non-transitory computer-readable medium storing executable instructions that when executed by the at least one processor cause the at least one processor to receive, via a wireless connection, audio data from a wearable device, the audio data having a sound of interest detected by a sound classifier executing a first machine-learning (ML) model, determine whether to translate the sound of interest to text data using a sound recognition engine on the computing device, translate, by the sound recognition engine, the sound of interest to the text data in response to the determination to use the sound recognition engine on the computing device, the sound recognition engine configured to execute a second ML model, and transmit, via the wireless connection, the text data to the wearable device.

Embodiment 39 is the computing device of embodiment 38, wherein the executable instructions include instructions that when executed by the at least one processor cause the at least one processor to transmit, over a network, the audio data to a server computer in response to the determination to not use the sound recognition engine on the computing device, and receive, over the network, the text data from the server computer.

Embodiment 40 is the computing device of any of embodiments 38 through 39, wherein the computing device includes a smartphone.

Embodiment 41 is a method that includes operations of the computing device of any of embodiments 38 through 39.

Embodiment 42 is a computer storage medium encoded with a computer program, the program comprising instructions that are operable, when executed by data processing apparatus, to cause the data processing apparatus to perform the operations of the computing device of any of embodiments 38 through 39.

Embodiment 43 is a method for distributed image recognition using a wearable device including receiving, via at least one imaging sensor of the wearable device, image data, detecting, by an image classifier of the wearable device, whether or not an object of interest is included within the image data, and transmitting, via a wireless connection, the image data to a computing device.

Embodiment 44 is the method of embodiment 43, wherein the image classifier executes a first machine-learning (ML) model.

Embodiment 45 is the method of any of embodiments 43 through 44, wherein the image data is configured to be used by the computing device for further image recognition using a second ML model.

Embodiment 46 is the method of any of embodiments 43 through 45, further comprising receiving, via the wireless connection, a bounding box dataset from the computing device.

Embodiment 47 is the method of any of embodiments 43 through 46, further comprising identifying, by an object tracker of the wearable device, an image region in subsequent image data captured by the at least one imaging sensor using the bounding box dataset.

Embodiment 48 is the method of any of embodiments 43 through 47, further comprising transmitting, via the wireless connection, the image region to the computing device, the image region configured to be used by the computing device for further image recognition.

Embodiment 49 is the method of any of embodiments 43 through 48, further comprising cropping, by the object tracker, the image region from the subsequent image data.

Embodiment 50 is the method of any of embodiments 43 through 49, further comprising compressing, by the object tracker, the image region, wherein the compressed image region is transmitted to the computing device over the wireless network.

Embodiment 51 is the method of any of embodiments 43 through 50, wherein the object of interest includes facial features.

Embodiment 52 is the method of any of embodiments 43 through 51, further comprising activating a first imaging sensor of the wearable device to capture first image data.

Embodiment 53 is the method of any of embodiments 43 through 45, further comprising detecting, by the image classifier, whether the first image data includes the object of interest.

Embodiment 54 is the method of any of embodiments 43 through 53, further comprising activating a second imaging sensor to capture second image data.

Embodiment 55 is the method of any of embodiments 43 through 44, wherein the second image data has a quality higher than the quality of the first image data.

Embodiment 56 is the method of any of embodiments 43 through 55, wherein the second image data is transmitted to the computing device via the wireless connection, the second image data configured to be used by the computing device for further image recognition.

Embodiment 57 is the method of any of embodiments 43 through 56, further comprising receiving, via a light condition sensor of the wearable device, light condition information.

Embodiment 58 is the method of any of embodiments 43 through 57, further comprising activating the first imaging sensor based on the light condition information.

Embodiment 59 is the method of any of embodiments 43 through 58, further comprising receiving, via a motion sensor of the wearable device, motion information.

Embodiment 60 is the method of any of embodiments 43 through 59, further comprising activating the first imaging sensor based on the motion information.

Embodiment 61 is the method of any of embodiments 43 through 60, wherein the wireless connection is a short-range wireless connection.

Embodiment 62 is the method of any of embodiments 43 through 61, wherein the wearable device includes smartglasses.

Embodiment 63 is the method of any of embodiments 43 through 62, wherein the computing device includes a smartphone.

Embodiment 64 is a system comprising one or more computers and one or more storage devices storing instructions that are operable, when executed by the one or more computers, to cause the one or more computers to perform the method of any one of embodiments 43 through 63.

Embodiment 65 is a wearable device configured to perform any of the embodiments 43 through 63.

Embodiment 66 is a computer storage medium encoded with a computer program, the program comprising instructions that are operable, when executed by data processing apparatus, to cause the data processing apparatus to perform the method of any of embodiments 43 through 63.

Embodiment 67 is a non-transitory computer-readable medium storing executable instructions that when executed by at least one processor cause the at least one processor to receive image data from one imaging sensor on a wearable device, detect, by an image classifier of the wearable device, whether or not an object of interest is included within the image data, the image classifier configured to execute a first machine-learning (ML) model, and transmit, via a wireless connection, the image data to a computing device, the image data configured to be used by the computing device to compute a bounding box dataset using a second ML model.

Embodiment 68 is the non-transitory computer-readable medium of embodiment 67, wherein the executable instructions include instructions that when executed by the at least one processor cause the at least one processor to receive, via the wireless connection, the bounding box dataset from the computing device, identify, by an object tracker of the wearable device, an image region in subsequent image data captured by the at least one imaging sensor using the bounding box dataset, and/or transmit, via the wireless connection, the image region to the computing device, the image region configured to be used by the computing device for further image recognition.

Embodiment 69 is the non-transitory computer-readable medium of any of embodiments 67 through 68, wherein the executable instructions include instructions that when executed by the at least one processor cause the at least one processor to crop, by the object tracker, the image region from the subsequent image data and/or compress, by the object tracker, the image region, wherein the compressed image region is transmitted to the computing device over the wireless network.

Embodiment 70 is the non-transitory computer-readable medium of any of embodiments 67 through 69, wherein the object of interest includes a barcode or text.

Embodiment 71 is the non-transitory computer-readable medium of any of embodiments 67 through 70, wherein the executable instructions include instructions that when executed by the at least one processor cause the at least one processor to activate a first imaging sensor of the wearable device to capture first image data, detect, by the image classifier, whether the first image data includes the object of interest, and/or activate a second imaging sensor to capture second image data, the second image data having a quality higher than the quality of the first image data, wherein the second image data is transmitted to the computing device via the wireless connection, the second image data configured to be used by the computing device for further image recognition.

Embodiment 72 is the non-transitory computer-readable medium of any of embodiments 67 through 71, wherein the executable instructions include instructions that when executed by the at least one processor cause the at least one processor to compress the second image data, wherein the compressed image data is transmitted to the computing device via the wireless connection.

Embodiment 73 is the non-transitory computer-readable medium of any of embodiments 67 through 72, wherein the executable instructions include instructions that when executed by the at least one processor cause the at least one processor to receive light condition information from a light condition sensor of the wearable device and/or determine whether to transmit the second image data based on the light condition information.

Embodiment 74 is the non-transitory computer-readable medium of any of embodiments 67 through 73, wherein the executable instructions include instructions that when executed by the at least one processor cause the at least one processor to receive motion information from a motion sensor of the wearable device, and determine whether to transmit the second image data based on the motion information.

Embodiment 75 is a wearable device for distributed image recognition, the wearable device comprising at least one imaging sensor configured to capture image data, an image classifier configured to detect whether or not an object of interest is included within the image data, the image classifier configured to execute a first machine-learning (ML) model, and a radio frequency (RF) transceiver configured to transmit, via a wireless connection, the image data to a computing device, the image data configured to be used by the computing device to compute a bounding box dataset using a second ML model.

Embodiment 76 is the wearable device of embodiment 75, wherein the RF transceiver is configured to receive, via the wireless connection, the bounding box dataset from the computing device, the wearable device further including an object tracker configured to identify an image region in subsequent image data captured by the at least one imaging sensor using the bounding box dataset, wherein the RF transceiver is configured to transmit, via the wireless connection, the image region to the computing device, the image region configured to be used by the computing device for further image recognition.

Embodiment 77 is the wearable device of any of embodiments 75 through 76, wherein the wearable device further comprises a sensor trigger configured to activate a first imaging sensor to capture first image data, the image classifier is configured to detect whether the first image data includes the object of interest, the sensor trigger configured to activate a second imaging sensor to capture second image data in response to the object of interest being detected in the first image data, the second image data having a quality higher than the quality of the first image data, wherein the RF transceiver is configured to transmit the second image data to the computing device over the wireless connection.

Embodiment 78 is a computing device for distributed image recognition, the computing device including at least one processor, and a non-transitory computer-readable medium storing executable instructions that when executed by the at least one processor cause the at least one processor to receive, via a wireless connection, image data from a wearable device, the image data having an object of interest detected by an image classifier executing a first machine-learning (ML) model, compute a bounding box dataset based on the image data using a second ML model, and transmit, via the wireless connection, the bounding box dataset to the wearable device.

Embodiment 79 is the computing device of embodiment 78, wherein the executable instructions include instructions that when executed by the at least one processor cause the at least one processor to receive, via the wireless connection, an image region in subsequent image data, and/or execute, by the second ML model, object recognition on the image region.

Embodiment 80 is a method for distributed hot-word recognition using a wearable device including receiving, via a microphone of the wearable device, audio data, detecting, by a voice command detector of the wearable device, a presence of a portion of a hot-word from the audio data, the voice command detector executing a first machine-learning (ML) model, storing, in a buffer of the wearable device, the audio data that is received via the microphone in response to the portion of the hot-word being detected, and transmitting, via a wireless connection, a portion of the audio data included in the buffer to a computing device, the portion of the audio data configured to be used by the computing device to perform hot-word recognition using a second ML model.

Embodiment 81 is the method of embodiment 80, further comprising transmitting, via the wireless connection, a remaining portion of the audio data included in the buffer to the computing device.

Embodiment 82 is the method of any of embodiments 80 through 81, further comprising receiving, via the wireless connection, an action command from the computing device, the action command causing the wearable device to perform an action.

Embodiment 83 is the method of any of embodiments 80 through 82, further comprising receiving, via the wireless connection, a disarm command from the computing device and/or discarding the audio data included in the buffer in response to the disarm command.

Embodiment 84 is a system comprising one or more computers and one or more storage devices storing instructions that are operable, when executed by the one or more computers, to cause the one or more computers to perform the method of any one of embodiments 80 through 83.

Embodiment 85 is a wearable device configured to perform any of the embodiments 80 through 83.

Embodiment 86 is a computer storage medium encoded with a computer program, the program comprising instructions that are operable, when executed by data processing apparatus, to cause the data processing apparatus to perform the method of any of embodiments 80 through 83.

Embodiment 87 is a method for sensing image data with multi-resolution using a wearable device, the method comprising activating a first imaging sensor of the wearable device to capture first image data, detecting, by a classifier of the wearable device, whether or not a region of interest (ROI) is included within the first image data, the classifier executing a first machine-learning (ML) model, activating a second imaging sensor of the wearable device to capture second image data in response to the ROI being detected within the first image data, the second image data having a resolution higher than a resolution of the first image data, and transmitting, via a wireless connection, the second image data to a computing device, the second image data configured to be used by the computing device for image processing using a second ML model.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:
   determining that a condition for motion of a wearable device achieves a threshold for stability based on sensor data from a motion sensor of the wearable device;
   detecting, by a first model on the wearable device, whether or not an object of interest is included within a first image frame;
   in response to the object of interest being detected in the first image frame and the condition achieving the threshold, transmitting the first image frame to a computing device;
   receiving location data generated by a second model on the computing device, the location data identifying a location of the object of interest in the first image frame;
   identifying an image region in a second image frame using the location data of the first image frame, the second image frame being subsequent to the first image frame; and
   transmitting the image region to the computing device.

2. The method of claim 1, further comprising:
extracting the image region from the second image frame; and
generating a compressed image region from the image region, wherein the compressed image region is transmitted to the computing device.

3. The method of claim 1, wherein the object of interest includes facial features, wherein the method further comprises:
performing, by the second model, facial recognition using the image region of the second image frame.

4. The method of claim 1, further comprising:
receiving first image data from a first camera;
detecting whether the object of interest is included in the first image data; and
in response to the object of interest being detected in the first image data, activating a second camera to obtain second image data, the second image data having a resolution higher than the first image data, wherein the first image frame is selected from the second image data.

5. The method of claim 4, further comprising:
receiving, via a light condition sensor of the wearable device, light condition information, the light condition information indicating a level of light; and
activating the first camera based on the light condition information.

6. The method of claim 1, wherein the wearable device includes an extended reality device configured to be worn on a head of a user, and the computing device includes a mobile user device wirelessly connected to the extended reality device.

7. The method of claim 1, further comprising:
receiving classification data associated with the object of interest, the classification data being determined by the second model; and
rendering the classification data on the wearable device.

8. The method of claim 7, wherein the classification data is rendered at a location in a field of view of a user that corresponds to the object of interest.

9. A non-transitory computer-readable medium storing executable instructions that when executed by at least one processor cause the at least one processor to execute operations, the operations comprising:
determining that a condition for motion of a wearable device achieves a threshold for stability based on sensor data from a motion sensor of the wearable device;
detecting, by a first model, whether or not an object of interest is included within a first image frame;
in response to the object of interest being detected in the first image frame and the condition achieving the threshold, transmitting the first image frame to a computing device;
receiving location data generated by a second model on the computing device, the location data identifying a location of the object of interest in the first image frame;
identifying an image region in a second image frame using the location data of the first image frame, the second image frame being subsequent to the first image frame; and
transmitting the image region to the computing device.

10. The non-transitory computer-readable medium of claim 9, wherein the operations further comprise:
selecting the image region from the second image frame; and
generating a compressed image region from the image region, wherein the compressed image region is transmitted to the computing device.

11. The non-transitory computer-readable medium of claim 9, wherein the object of interest includes a machine-readable representation of data, wherein the operations further comprise:
decoding, by the second model, the machine-readable representation of data from the image region.

12. The non-transitory computer-readable medium of claim 9, wherein the operations further comprise:
receiving first image data from a first camera;
detecting whether the object of interest is included in the first image data; and
in response to the object of interest being detected in the first image data, activating a second camera to obtain second image data, the second image data having a resolution higher than the first image data, wherein the first image frame is selected from the second image data.

13. The non-transitory computer-readable medium of claim 12, wherein the operations further comprise:
performing, by the second model, facial recognition using the image region of the second image frame.

14. The non-transitory computer-readable medium of claim 12, wherein the operations further comprise:
receiving light condition information from a light condition sensor of the wearable device, the light condition information indicating a level of ambient light; and
activating the first camera in response to the level of ambient light achieving a threshold level.

15. A wearable device for distributed image recognition, the wearable device comprising:
at least one processor; and
a non-transitory computer-readable medium storing executable instructions that cause the at least one processor to:
determine that a condition for motion of a wearable device achieves a threshold for stability based on sensor data from a motion sensor of the wearable device;
detect whether or not an object of interest is included within a first image frame;
in response to the object of interest being detected in the first image frame and the condition achieving the threshold, transmit the first image frame to a computing device;
receive location data generated by a second model on the computing device, the location data identifying a location of the object of interest in the first image frame;
identify an image region in a second image frame using the location data of the first image frame, the second image frame being subsequent to the first image frame; and
transmit the image region to the computing device.

16. The wearable device of claim 15, wherein the executable instructions include instructions that cause the at least one processor to:
activate a first camera in response to a level of ambient light achieving a threshold condition;
receive first image data from the first camera;
detect whether the object of interest is included in the first image data; and in response to the object of interest being detected in the first image data, activate a second camera to obtain second image data, the second image data having a resolution higher than the first image data, wherein the first image frame is selected from the second image data.

17. The wearable device of claim 15, wherein the executable instructions include instructions that cause the at least one processor to:
generate a compressed image region from the image region, wherein the compressed image region is transmitted to the computing device.

18. The wearable device of claim 15, wherein the executable instructions include instructions that cause the at least one processor to:
receive classification data associated with the object of interest, the classification data being determined by the second model; and
render the classification data at a location on a display of the wearable device that corresponds to a location of the object of interest.

19. The wearable device of claim 15, wherein the wearable device includes an extended reality device configured to be worn on a head of a user, the computing device includes a mobile user device wirelessly connected to the extended reality device.

* * * * *